US012629936B2

(12) United States Patent
Yoshida

(10) Patent No.: US 12,629,936 B2
(45) Date of Patent: May 19, 2026

(54) LIQUID DISCHARGE HEAD AND LIQUID DISCHARGE APPARATUS

(71) Applicant: Takahiro Yoshida, Kanagawa (JP)

(72) Inventor: Takahiro Yoshida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 197 days.

(21) Appl. No.: 18/415,706

(22) Filed: Jan. 18, 2024

(65) Prior Publication Data

US 2024/0246337 A1 Jul. 25, 2024

(30) Foreign Application Priority Data

Jan. 20, 2023 (JP) ................................ 2023-007372

(51) Int. Cl.
*B41J 2/055* (2006.01)
*B41J 2/14* (2006.01)

(52) U.S. Cl.
CPC ........... *B41J 2/055* (2013.01); *B41J 2/14274* (2013.01); *B41J 2002/14306* (2013.01); *B41J 2002/14419* (2013.01); *B41J 2202/12* (2013.01)

(58) Field of Classification Search
CPC .................... B41J 2/055; B41J 2/14274; B41J 2002/14306; B41J 2002/14419; B41J 2202/12; B41J 2002/14403
See application file for complete search history.

(56) References Cited

U.S. PATENT DOCUMENTS

2014/0009544 A1 1/2014 Koda
2015/0246536 A1 9/2015 Yoshida
2016/0185113 A1 6/2016 Yoshida et al.
2016/0297193 A1 10/2016 Yoshida
2017/0057233 A1* 3/2017 Ueda ........................ B41J 2/175
2017/0239949 A1 8/2017 Yoshida
2018/0257374 A1 9/2018 Yoshida et al.
2020/0147961 A1 5/2020 Yoshida
2020/0238696 A1 7/2020 Yoshida
2022/0032621 A1 2/2022 Yoshida et al.

FOREIGN PATENT DOCUMENTS

JP 2014-008696 A 1/2014
JP 6024884 B2 11/2016
JP 2017-144659 A 8/2017
JP 2018-154065 A 10/2018

OTHER PUBLICATIONS

Extended European Search Report issued Jun. 10, 2024 in European Patent Application No. 24152370.3, 8 pages.

* cited by examiner

*Primary Examiner* — Justin Seo
(74) *Attorney, Agent, or Firm* — XSENSUS LLP

(57) ABSTRACT

A liquid discharge head includes a nozzle plate, a channel substrate, a frame, and a vibration attenuator. The nozzle plate has multiple nozzles from which a liquid is discharged in a liquid discharge direction. The channel substrate has multiple individual liquid chambers communicating with the multiple nozzles, respectively. The frame has a first end adjacent to the channel substrate, a second end opposite the first end in the liquid discharge direction, and a common liquid chamber between the first end and the second end and communicating with the multiple individual liquid chambers. The vibration attenuator is disposed between the first end and the second end in the common liquid chamber. The vibration attenuator has a through hole through which the liquid flows in the common liquid chamber.

15 Claims, 16 Drawing Sheets

FIG. 3 COMPARATIVE EXAMPLE

FIG. 14
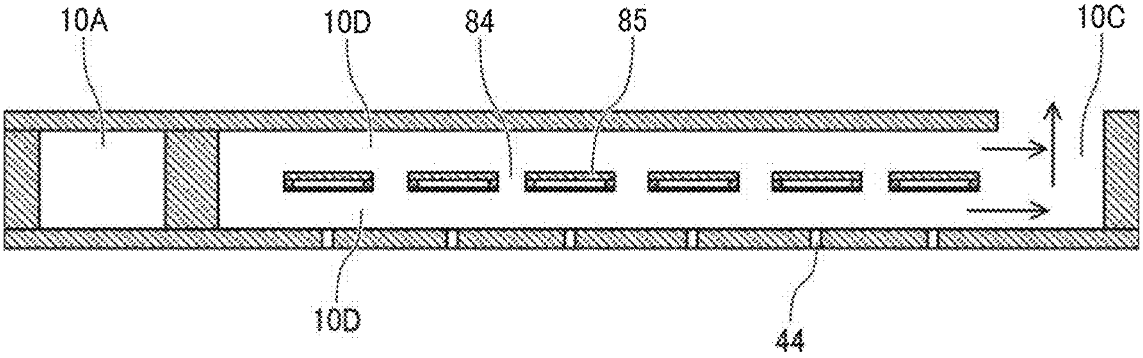
FIG. 15 COMPARATIVE EXAMPLE
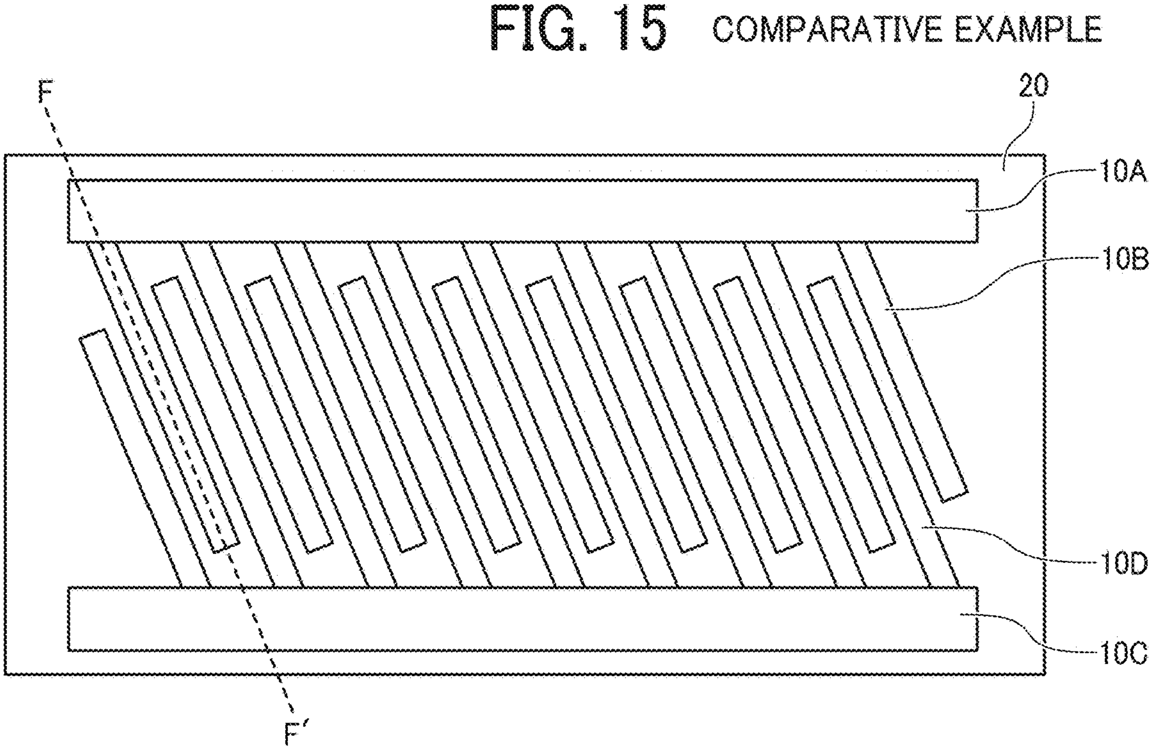
FIG. 16 COMPARATIVE EXAMPLE
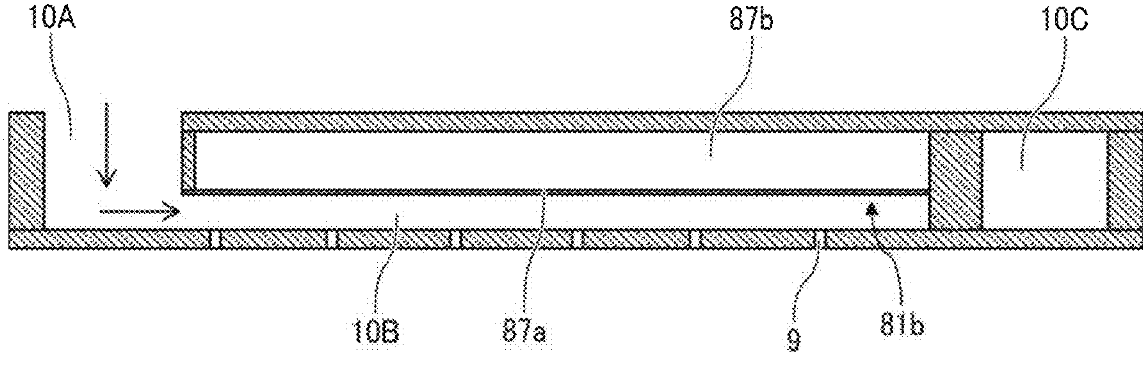

FIG. 21 COMPARATIVE EXAMPLE
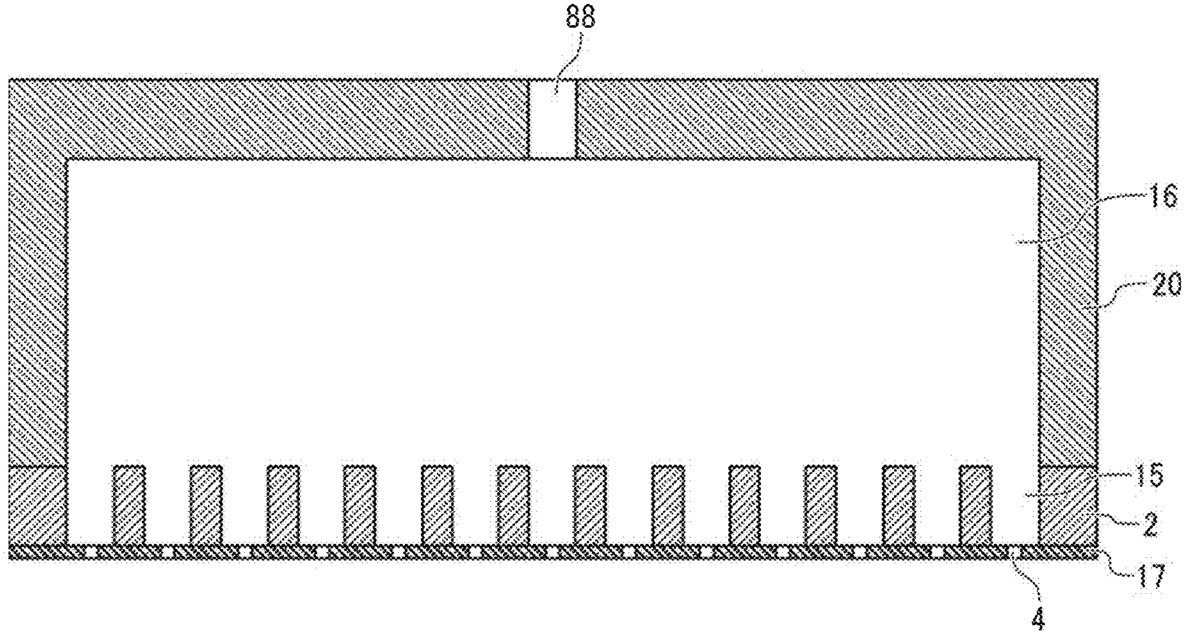
FIG. 22
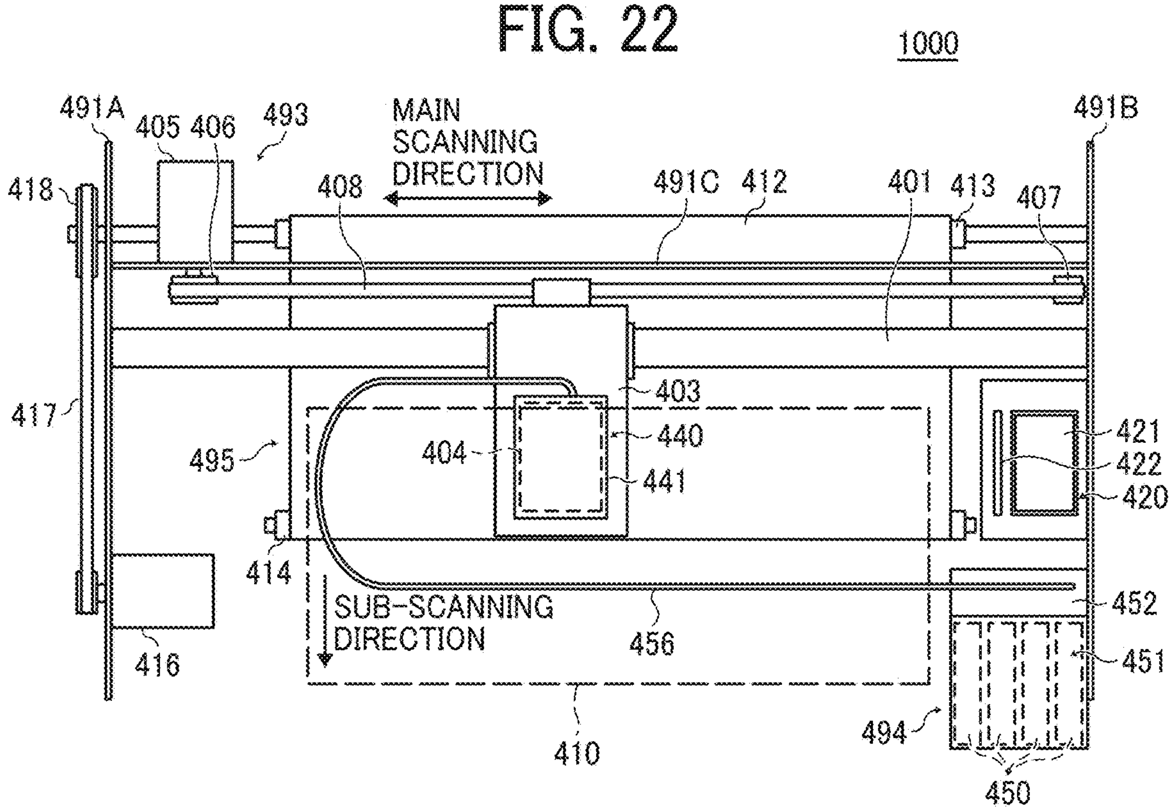

LIQUID DISCHARGE HEAD AND LIQUID DISCHARGE APPARATUS

CROSS-REFERENCE TO RELATED APPLICATION

This patent application is based on and claims priority pursuant to 35 U.S.C. § 119(a) to Japanese Patent Application No. 2023-007372, filed on Jan. 20, 2023, in the Japan Patent Office, the entire disclosure of which is hereby incorporated by reference herein.

BACKGROUND

Technical Field

Embodiments of the present disclosure relate to a liquid discharge head and a liquid discharge apparatus.

Related Art

A liquid discharge head has a structure in which a nozzle plate, a channel substrate, and a frame are joined together. In the related art, a liquid discharge head includes a vibration attenuator on the top of a common liquid chamber to attenuate pressure vibration in the common liquid chamber.

SUMMARY

Embodiments of the present disclosure describe an improved liquid discharge head that includes a nozzle plate, a channel substrate, a frame, and a vibration attenuator. The nozzle plate has multiple nozzles from which a liquid is discharged in a liquid discharge direction. The channel substrate has multiple individual liquid chambers communicating with the multiple nozzles, respectively. The frame has a first end adjacent to the channel substrate, a second end opposite the first end in the liquid discharge direction, and a common liquid chamber between the first end and the second end and communicating with the multiple individual liquid chambers. The vibration attenuator is disposed between the first end and the second end in the common liquid chamber. The vibration attenuator has a through hole through which the liquid flows in the common liquid chamber.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 14 is a schematic cross-sectional view of the vibration attenuator of FIG. 12 on the collection side, according to the fourth embodiment;

FIG. 15 is a schematic plan view of a liquid discharge head according to a second comparative example;

FIG. 16 is a schematic cross-sectional view of a vibration attenuator of the liquid discharge head of FIG. 15, according to the second comparative example;

FIG. 21 is a schematic cross-sectional view of a liquid discharge head according to a third comparative example;

FIG. 22 is a schematic plan view of a liquid discharge apparatus according to embodiments of the present disclosure;

Figure 1:
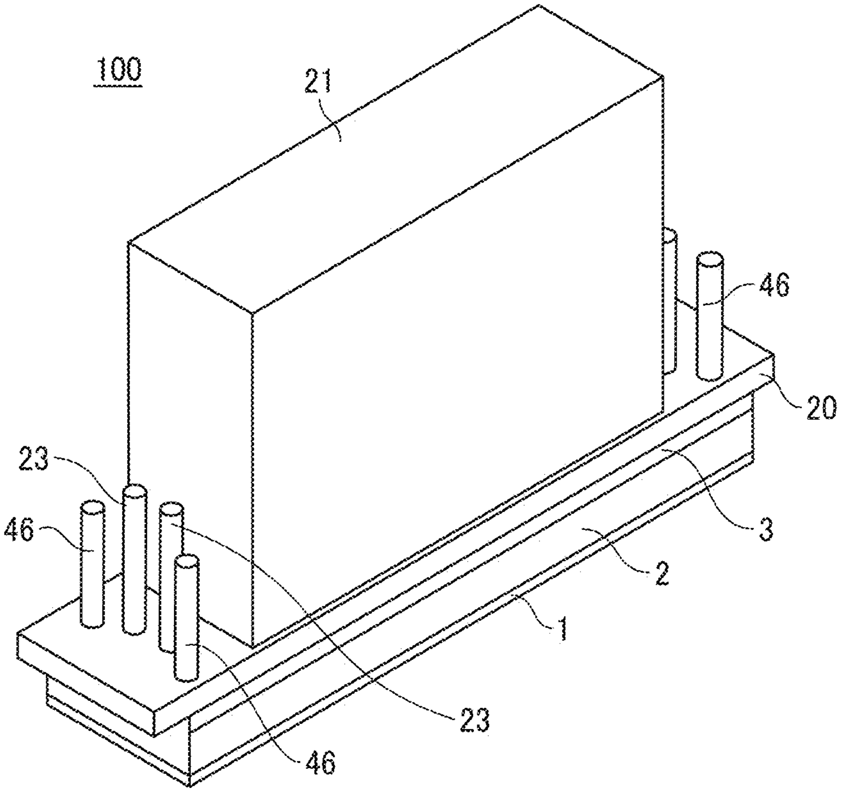
FIG. 1 is a schematic perspective external view of a liquid discharge head according to a first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A liquid discharge head and a liquid discharge apparatus according to embodiments of the present disclosure are described below with reference to the drawings. Embodiments of the present disclosure are not limited to the embodiments described below and may be other embodiments than the embodiments described below. The following embodiments may be modified by, for example, addition, modification, or omission within the scope that would be obvious to one skilled in the art. Any aspects having advantages as described for the following embodiments according to the present disclosure are included within the scope of the present disclosure.

A liquid discharge head includes: a frame provided with a common liquid chamber; a channel substrate provided with multiple individual liquid chambers in communication with the common liquid chamber; and a vibration attenuator provided, in the common liquid chamber, at a predetermined position between an end and another end of the common liquid chamber in a liquid discharge direction of the liquid discharge head. The vibration attenuator has a through hole that forms a channel for liquid in the common liquid chamber.

According to one aspect of the present disclosure, a liquid discharge head can be provided that can prevent the pressure vibration in the individual liquid chamber from propagating to another individual liquid chamber and the fluid resistance of the common liquid chamber from increasing to discharge liquid satisfactorily. A liquid discharge apparatus according to an embodiment of the present disclosure includes the liquid discharge head according to the present embodiment to discharge liquid satisfactorily.

First Embodiment

Figure 2:
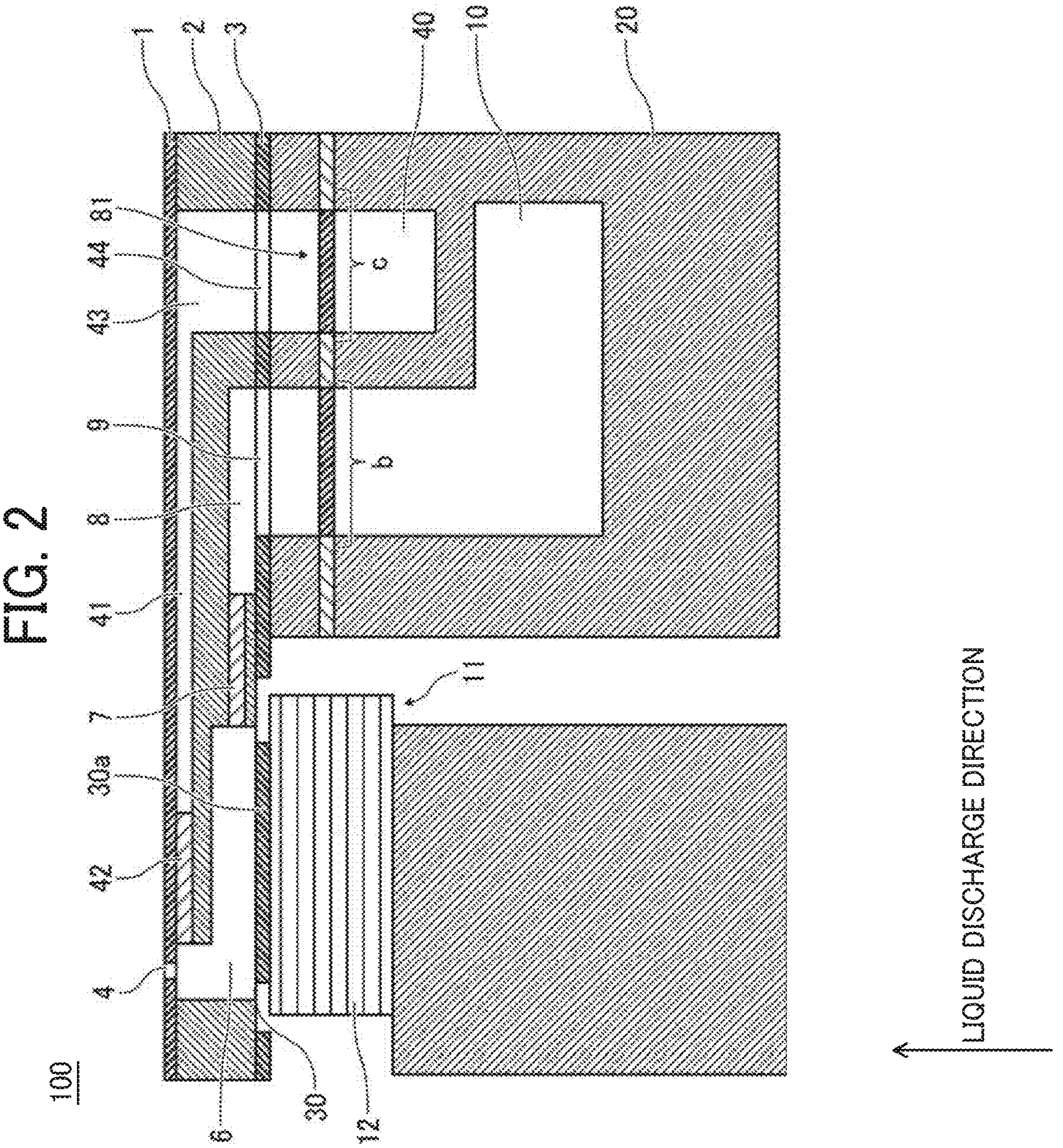
FIG. 2 is a schematic cross-sectional view of the liquid discharge head of FIG. 1, according to the first embodiment.

FIG. 1 is a schematic perspective external view of a liquid discharge head according to an embodiment of the present disclosure. FIG. 2 is a schematic cross-sectional view of the liquid discharge head (may be referred to simply as the head) of FIG. 1 in a direction orthogonal to a nozzle array direction. Although a liquid discharge direction is downward in FIG. 1, the liquid discharge direction is upward in FIG. 2.

The liquid discharge head illustrated in FIGS. 1 and 2 is a circulation type liquid discharge head which is preferable. However, embodiments of the present disclosure are not limited to such a circulation type liquid discharge head. According to embodiments of the present disclosure, a circulation type liquid discharge head does not increase the size of the head and can attenuate the pressure vibration of the head.

A liquid discharge head 100 according to an embodiment of the present disclosure includes a nozzle plate 1, a channel substrate 2, and a frame 20 joined in layers. The liquid discharge head 100 according to the present embodiment further includes a diaphragm 3 between the channel substrate 2 and the frame 20. The liquid discharge head according to the present embodiment further includes a piezoelectric actuator 11 that displaces the diaphragm 3.

The frame 20 is provided with a common liquid chamber. Since the liquid discharge head according to the present embodiment is of a circulation type, the common liquid chamber includes a supply-side common liquid chamber 10 for supplying liquid to an individual liquid chamber and a collection-side common liquid chamber 40 for collecting the liquid from the individual liquid chamber.

As illustrated in FIG. 1, supply ports 23 in communication with the supply-side common liquid chamber 10 and collection ports 46 in communication with the collection-side common liquid chamber 40 are disposed outside a cover 21 and the frame 20.

The nozzle plate 1 has multiple nozzles 4 from which liquid is discharged. The nozzle plate may be referred to as a nozzle substrate or a nozzle member. The multiple nozzles 4 of the nozzle plate 1 corresponds one-to-one to the individual liquid chambers.

The channel substrate 2 includes a pressure generation chamber 6 in communication with a nozzle 4, a supply-side fluid restrictor 7 in communication with the pressure generation chamber 6, and a liquid introducing section 8 in communication with the supply-side fluid restrictor 7. In the present embodiment, the liquid introducing section 8 is sectioned per pressure generation chamber 6. The liquid introducing section 8 is not limited to the above-described structure. An individually separate liquid introducing section 8 may be provided per pressure generation chamber 6. In this case, multiple liquid introducing sections 8 are formed for a single common liquid chamber.

Since the liquid discharge head according to the present embodiment is of the circulation type, the channel substrate 2 further includes a collection-side fluid restrictor 42 in communication with the pressure generation chamber 6, a collection channel 41 in communication with the collection-side fluid restrictor 42, and a discharge section 43 in communication with the collection channel 41. The supply-side fluid restrictor 7, the liquid introducing section 8, the collection-side fluid restrictor 42, the collection channel 41, and the discharge section 43 can be each formed, for example, with a through hole or a groove.

The channel substrate 2 has multiple individual liquid chambers in communication with the common liquid chamber.

In the present embodiment, in the circulation type liquid discharge head, the liquid introducing section 8, the pressure generation chamber 6, the collection channel 41, and the discharge section 43 are defined as the individual liquid chamber. In a non-circulation type liquid discharge head, the liquid introducing section 8 and the pressure generation chamber 6 are defined as the individual liquid chamber. The supply-side fluid restrictor 7 and the collection-side fluid restrictor 42 may be included in the individual liquid chamber.

The diaphragm 3 forms a wall face of the pressure generation chamber 6. For example, the diaphragm 3 may have a two-layer structure. For example, such a two-layer structure may include a first layer forming a thin part and a second layer forming a thick part in this order from the channel substrate 2 side. The diaphragm 3 has a vibration region 30. For example, the vibration region 30 is formed of the first layer. The vibration region 30 is a deformable portion disposed at a position corresponding to the pressure generation chamber 6. A projection **30*a* as the thick part is disposed at a position corresponding to the piezoelectric actuator 11. For example, the projection 30*a*** is formed of the second layer.

The diaphragm 3 according to the present embodiment includes a supply-side filter 9 and a collection-side filter 44. For example, liquid flows from the supply-side common liquid chamber 10 into the liquid introducing section 8 through the supply-side filter 9. For example, liquid flows from the discharge section 43 into the collection-side common liquid chamber 40 through the collection-side filter 44. For example, the supply-side filter 9 and the collection-side filter 44 are formed of the first layer of the diaphragm 3.

The channel substrate 2 may include the diaphragm 3 or may not include the diaphragm 3. The piezoelectric actuator 11 is disposed opposite the pressure generation chamber 6 across the diaphragm 3. The piezoelectric actuator 11 serves as a driver (may be referred to as an actuator or a pressure generator) that deforms the vibration region 30 of the diaphragm 3. The piezoelectric actuator 11 includes an electromechanical transducer element (may be referred to as a piezoelectric element).

The piezoelectric actuator 11 includes, for example, a piezoelectric element 12 joined onto a base. The piezoelectric element 12 includes piezoelectric layers and internal electrodes alternately laminated, and each internal electrode is led out to an end face to form an external electrode. The piezoelectric element 12 is driven by the application of a drive waveform.

In the liquid discharge head 100 according to the present embodiment, for example, the voltage applied to the piezoelectric element 12 is lowered from the reference potential to contract the piezoelectric element 12. Thus, the portion of the diaphragm 3 corresponding to the piezoelectric element 12 deforms in a direction away from the nozzle 4, and the volume of the pressure generation chamber 6 increases. Thus, liquid flows into the pressure generation chamber 6.

Then, the voltage applied to the piezoelectric element 12 is raised to expand the piezoelectric element 12 in a lamination direction thereof. Thus, the diaphragm 3 deforms toward the nozzle 4, and the volume of the pressure generation chamber 6 decreases. Thus, the liquid in the pressure generation chamber 6 is pressurized, so that the liquid is discharged from the nozzle 4.

Subsequently, the voltage applied to the piezoelectric element 12 is returned to the reference potential to restore the diaphragm 3 to the initial position. Thus, the pressure generation chamber 6 expands to generate the negative pressure, so that the pressure generation chamber 6 is filled with liquid from the supply-side common liquid chamber 10. After the vibration of the meniscus face of the liquid in the nozzle 4 is attenuated and the meniscus face is stabilized, the operation for the next liquid discharge is prepared.

Note that the method of driving the liquid discharge head 100 is not limited to the above-described example (pull-push discharge). For example, pull discharge or push discharge may be performed in accordance with the way to apply a drive waveform.

As illustrated in FIG. 2, in the present embodiment, the frame 20 has a vibration attenuator 81 in the common liquid chamber. The vibration attenuator 81 is restorably deformable and has a function of attenuating pressure vibration. As illustrated in FIG. 2, in the present embodiment, the vibration attenuator 81 is disposed, in the common liquid chamber, close to the individual liquid chamber.

A comparative example is described below with reference to FIG. 3.

Figure 3:
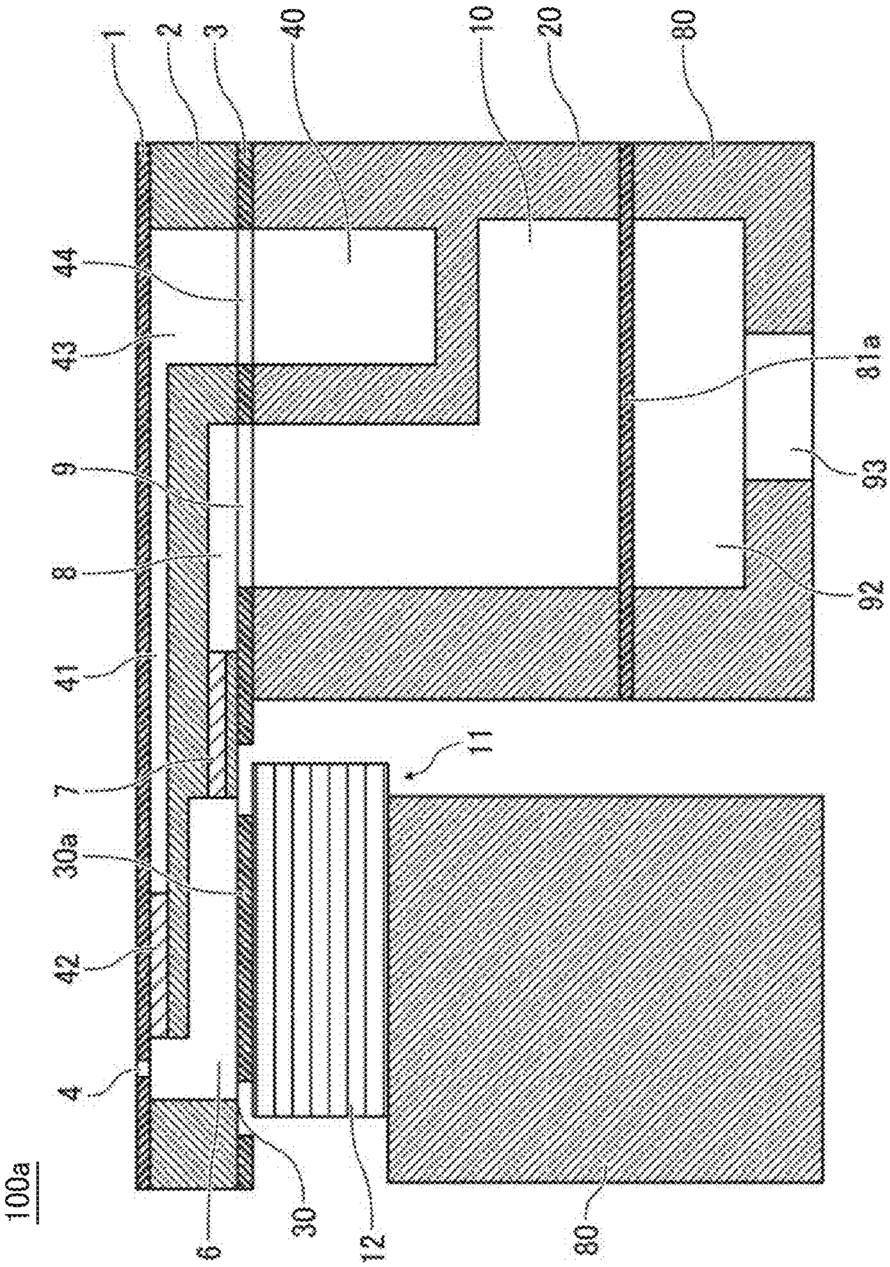
FIG. 3 is a schematic cross-sectional view of a liquid discharge head according to a first comparative example.

FIG. 3 is a schematic cross-sectional view of a liquid discharge head according to a first comparative example, which is similar to the schematic cross-sectional view of FIG. 2. For example, a liquid discharge head 100*a* according to the first comparative example includes a vibration attenuator 81*a* different in arrangement from the vibration attenuator 81 of the liquid discharge head 100 according to the present embodiment. As illustrated in FIG. 3, the vibration attenuator 81*a* according to the first comparative example is disposed far apart from the individual liquid chamber. The vibration attenuator 81*a* according to the first comparative example is a thin film, and interposed and held between the frame 20 and an attenuator holder 80. In the first comparative example, the liquid discharge head 100*a* has a damper chamber 92 in which the vibration attenuator 81*a* is deformable and an atmosphere communication hole 93 through which the damper chamber 92 is in communication with the atmosphere.

In the first comparative example, a long periodic pressure vibration caused by a rapid change in flow rate in the common liquid chamber due to the liquid discharge from the liquid discharge head, which may be referred to as water hammer, can be attenuated by the vibration attenuator 81*a*. However, in the first comparative example, because of a long distance between the individual liquid chamber (more specifically, the liquid introducing section 8) and the vibration attenuator 81*a*, the pressure vibration in the individual liquid chamber is not sufficiently attenuated by the vibration attenuator 81*a*. As a result, a short periodic pressure vibration generated in the individual liquid chamber is not sufficiently attenuated by the vibration attenuator 81*a*. In the first comparative example, the pressure vibration in the individual liquid chamber may propagate to an adjacent individual liquid chamber and affect liquid discharge.

In the first comparative example, when the common liquid chamber is low in height and a distance between the individual liquid chamber and the vibration attenuator 81*a* is short, the fluid resistance of the common liquid chamber may increase. In this case, the pressure loss in the common liquid chamber may cause supply shortage, and thus the liquid discharge head may not discharge liquid. When the fluid resistance of the common liquid chamber is large, for example, the pressure difference between the respective meniscuses of the individual liquid chambers is generated. Thus, the variations in the liquid discharge may occur. Accordingly, the liquid discharge head 100*a* according to the first comparative example may not discharge liquid satisfactorily. In the first comparative example, when the liquid discharge head 100*a* is of the circulation type, the vibration attenuator 81*a* is not disposed on the collection side.

The configuration of the vibration attenuator is diligently examined in order to attenuate the short periodic pressure vibration in the individual liquid chamber. Such an examination includes an examination of arrangement of the vibration attenuator and an examination of a value of compliance. It is considered that, favorably, the value of compliance of the vibration attenuator for attenuating the pressure vibration in the individual liquid chamber is smaller than the value of compliance for attenuating the long periodic pressure vibration in the common liquid chamber. Accordingly, the vibration attenuator is arranged as follows in the present embodiment.

As illustrated in FIG. 2, the vibration attenuator 81 is disposed close to the individual liquid chamber, in the common liquid chamber (e.g., in the supply-side common liquid chamber 10). However, in this case, the common liquid chamber may have a large fluid resistance. As a result, the pressure loss in the common liquid chamber may cause supply shortage, and thus the liquid discharge head may not discharge liquid. When the fluid resistance of the common liquid chamber is large, for example, the pressure difference between the respective meniscuses of the pressure generation chambers 6 is generated. Thus, the variations in the liquid discharge may occur.

Thus, in the present embodiment, the vibration attenuator 81 is disposed close to the individual liquid chamber and has a through hole forming a channel in the common liquid chamber through which liquid flows. The vibration attenuator 81 having the through hole can prevent the fluid resistance of the common liquid chamber from increasing. As a result, the supply shortage caused by the pressure loss in the common liquid chamber can be prevented, and thus the liquid discharge head can discharge liquid as desired. The variations in the liquid discharge caused by the pressure difference between the respective meniscuses of pressure generation chambers 6 can be prevented.

In the present embodiment, the vibration attenuator 81 is disposed close to the individual liquid chamber and has the through hole. Accordingly, the pressure vibration in the individual liquid chamber can be prevented from propagating to another individual liquid chamber, and the fluid resistance of the common liquid chamber can be prevented from increasing, to discharge liquid satisfactorily.

The liquid discharge head according to the present embodiment has the following features. The liquid discharge head according to the present embodiment includes a vibration attenuator disposed, in the common liquid chamber, at a predetermined position between one end and the other end of the common liquid chamber in the liquid discharge direction of the liquid discharge head. The vibration attenuator has the through hole, and the through hole forms a channel in the common liquid chamber through which liquid flows.

In the above description, the terms "the vibration attenuator 81 is disposed close to the individual liquid chamber" mean that the vibration attenuator 81 is disposed, in the common liquid chamber, at a predetermined position between one end and the other end of the common liquid chamber in the liquid discharge direction. For example, in a comparative example, a vibration attenuator is disposed on the top of the common liquid chamber, instead of in the common liquid chamber. In another comparative example, a damper has no through hole. Thus, the fluid resistance of the common liquid chamber may increase. In this case, liquid does not pass through the damper. Thus, the damper can be regarded as being disposed on the top of the common liquid chamber.

Figure 4:
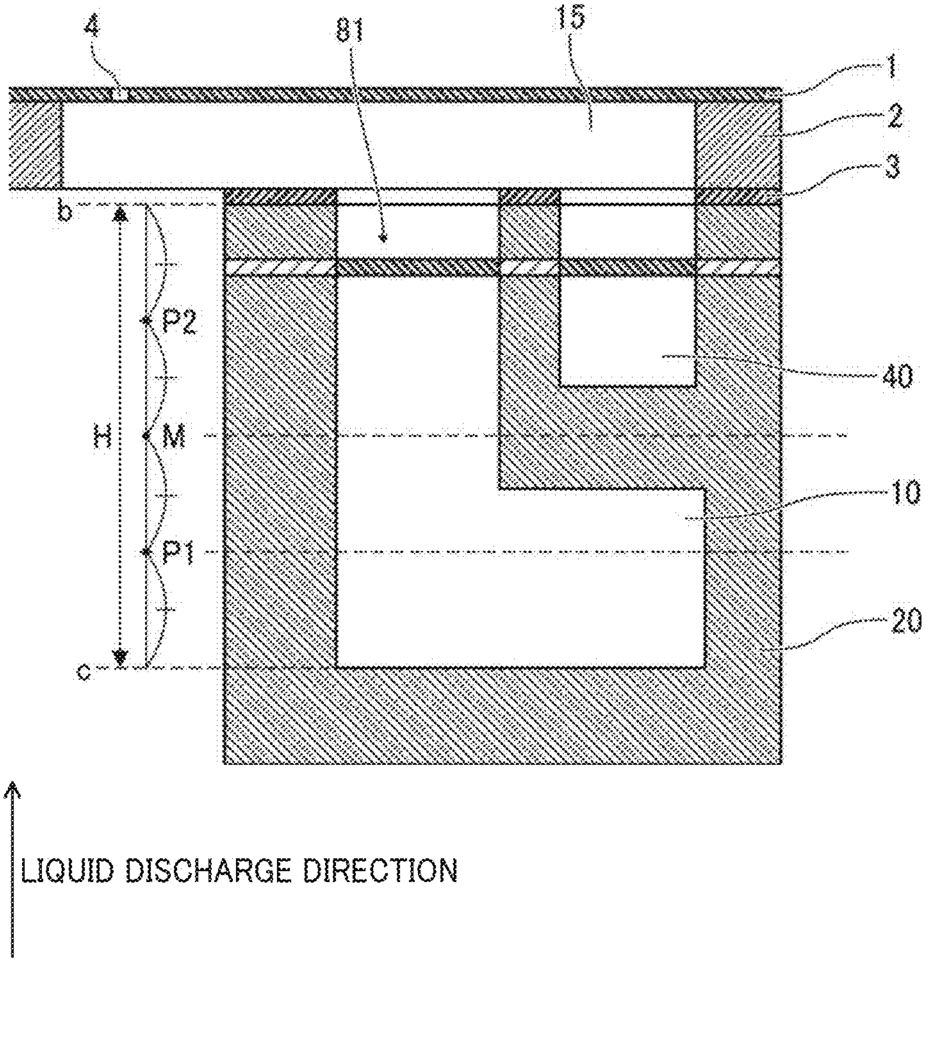
FIG. 4 is a schematic cross-sectional view of the liquid discharge head of FIG. 1 illustrating the arrangement of a vibration attenuator, according to the first embodiment.

FIG. 4 is a schematic cross-sectional view of the liquid discharge head illustrating a preferred position at which the vibration attenuator 81 is disposed. This schematic cross-sectional view is similar to the cross-sectional view of FIG. 2. Note that, for description, the illustration is partially simplified.

Preferably, the vibration attenuator 81 is disposed closer to the individual liquid chamber than a point P1 at three quarters of a common-liquid-chamber height H from the individual liquid chamber side. The common-liquid-chamber height H is the maximum distance between one end and the other end of the common liquid chamber in the liquid discharge direction of the liquid discharge head. In this case, the pressure vibration in the individual liquid chamber can be prevented from propagating to another individual liquid chamber.

More preferably, the vibration attenuator 81 is disposed closer to the individual liquid chamber than a middle point M of the common-liquid-chamber height H. In this case, the pressure vibration (e.g., a short periodic pressure vibration) in an individual liquid chamber 15 can be further reduced, so that the pressure vibration in the individual liquid chamber 15 can be further prevented from propagating to an adjacent individual liquid chamber 15.

The liquid discharge direction of the liquid discharge head 100 is indicated by the arrow in FIG. 4, and the individual liquid chamber 15 is illustrated in FIG. 4. The individual liquid chamber 15 includes the liquid introducing section 8, the pressure generation chamber 6, and the discharge section 43, as described above. The common-liquid-chamber height H is the maximum distance from one end to the other end of the common liquid chamber in the liquid discharge direction of the liquid discharge head. The common-liquid-chamber height H has the end denoted with a reference sign b and the other end denoted with a reference sign c. The middle point of the common-liquid-chamber height H is denoted with a reference sign M. The point at three quarters of the common-liquid-chamber height H from the individual liquid chamber side is denoted with a reference sign P1. The point at a quarter of the common-liquid-chamber height H from the individual liquid chamber side is denoted with a reference sign P2.

More preferably, the vibration attenuator 81 is disposed close to the individual liquid chamber 15. For example, more preferably, the vibration attenuator 81 is disposed within the quarter of the common-liquid-chamber height H from the end of the common liquid chamber (i.e., the end b of the common-liquid-chamber height H) in the liquid discharge direction. In other words, more preferably, the vibration attenuator 81 is disposed closer to the individual liquid chamber than the point P2 at the quarter of the common-liquid-chamber height H from the individual liquid chamber side.

Preferably, the vibration attenuator 81 is away, to some extent, from the individual liquid chamber 15. For example, preferably, the vibration attenuator 81 is disposed away from the end of the common liquid chamber (i.e., the end b of the common-liquid-chamber height H) by one-tenth of the common-liquid-chamber height H in the liquid discharge direction. Thus, appropriate adjustment of the vibration attenuator 81 in arrangement can further reduce the pressure vibration in the individual liquid chamber 15.

As illustrated in FIGS. 2 and 4, when the common liquid chamber is divided into the supply-side common liquid chamber 10 and the collection-side common liquid chamber 40, the vibration attenuator 81 is disposed in both the supply-side common liquid chamber 10 and the collection-side common liquid chamber 40. In this case, the vibration attenuator 81 in both the supply-side common liquid chamber 10 and the collection-side common liquid chamber 40 is disposed closer to the individual liquid chamber 15 than the middle point M of the common-liquid-chamber height H. As a result, the pressure vibration in the individual liquid chamber 15 can be attenuated not only on the supply side but also on the collection side to enhance the discharging performance of the liquid discharge head.

In the present embodiment, the common liquid chamber includes the supply-side common liquid chamber 10 for supplying liquid to the individual liquid chamber and the collection-side common liquid chamber 40 for collecting the liquid from the individual liquid chamber. The vibration attenuator 81 is disposed in both the supply-side common liquid chamber 10 and the collection-side common liquid chamber 40.

The vibration attenuator 81 in the collection-side common liquid chamber 40 is advantageous. In a liquid discharge head having a multilayered piezoelectric structure as illustrated in, for example, FIG. 2, it is difficult to dispose a vibration attenuator according to the comparative example into the common liquid chamber. In particular, the propagation of pressure vibration from the individual liquid chamber and the pressure loss of the common liquid chamber are likely to occur in the collection-side common liquid chamber 40. The collection-side common liquid chamber 40 narrower than the supply-side common liquid chamber 10 may cause the above-described situation. For this reason, the vibration attenuator 81 in the collection-side common liquid chamber 40 can further enhance the discharging performance.

From such a viewpoint, when the common liquid chamber includes the supply-side common liquid chamber 10 and the collection-side common liquid chamber 40, preferably, the common-liquid-chamber height H is defined by the collection-side common liquid chamber 40. In other words, when the common-liquid-chamber height H is the maximum distance between one end and the other end of the collection-side common liquid chamber 40 in the liquid discharge direction, preferably, the vibration attenuator 81 is disposed closer to the individual liquid chamber 15 than the middle point M of the common-liquid-chamber height H.

The arrangement of the vibration attenuator 81 may be different from the above embodiment. The distance between the vibration attenuator 81 and the individual liquid chamber is preferably not more than half of the distance between an individual liquid chamber in communication with the common liquid chamber and another individual liquid chamber adjacent to the individual liquid chamber. In this case, similarly to the above arrangement, the pressure vibration in the individual liquid chamber can be further prevented from propagating to another individual liquid chamber.

The vibration attenuator 81 in the supply-side common liquid chamber 10 and the vibration attenuator 81 in the collection-side common liquid chamber 40 may be dispose at different positions in the liquid discharge direction. However, from the viewpoint of processing, preferably, both the vibration attenuators 81 are disposed at the same position in the liquid discharge direction.

Figure 5A:
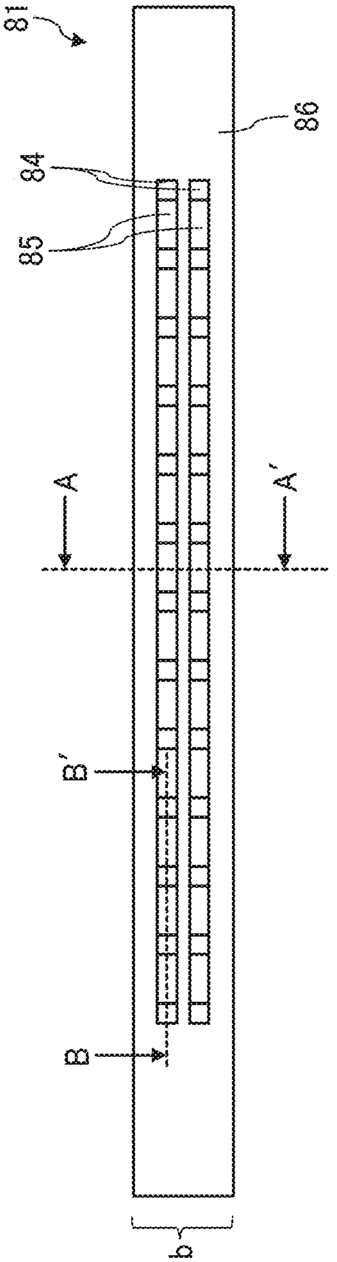
FIGS. 5A and 5B are schematic plan views of the vibration attenuator of FIG. 4 on the supply side, according to the first embodiment.
Figure 5B:
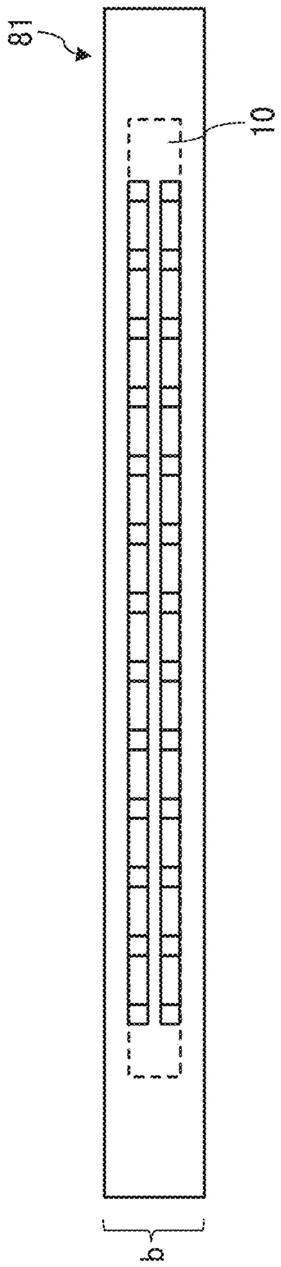

Through holes of the vibration attenuator 81 are described below with reference to FIGS. 5A to 6B. FIG. 5A is a schematic plan view of the vibration attenuator 81 in the supply-side common liquid chamber 10 corresponding to a portion b in FIG. 2. A cross-sectional view taken along line A-A' of FIG. 5A corresponds to the schematic cross-sectional view of FIG. 2. Dampers 85 illustrated in FIG. 5A are omitted in FIG. 2. Through holes 84 are also omitted in FIG. 2. FIG. 5B is another schematic plan view of the vibration attenuator 81, similar to the schematic plan view of FIG. 5A, illustrating the relative position between the supply-side common liquid chamber 10 and the vibration attenuator 81.

A non-attenuation region 86 is illustrated in FIG. 5A. The non-attenuation region 86 is, for example, a portion located out of the common liquid chamber. Alternatively, for example, a portion excluding the dampers 85 and through holes 84 in the vibration attenuator 81 may be referred to as the non-attenuation region 86. Even when the vibration attenuator 81 includes the non-attenuation region 86, the vibration attenuator 81 according to the present embodiment can be regarded as being disposed in the common liquid chamber.

Figure 6A:
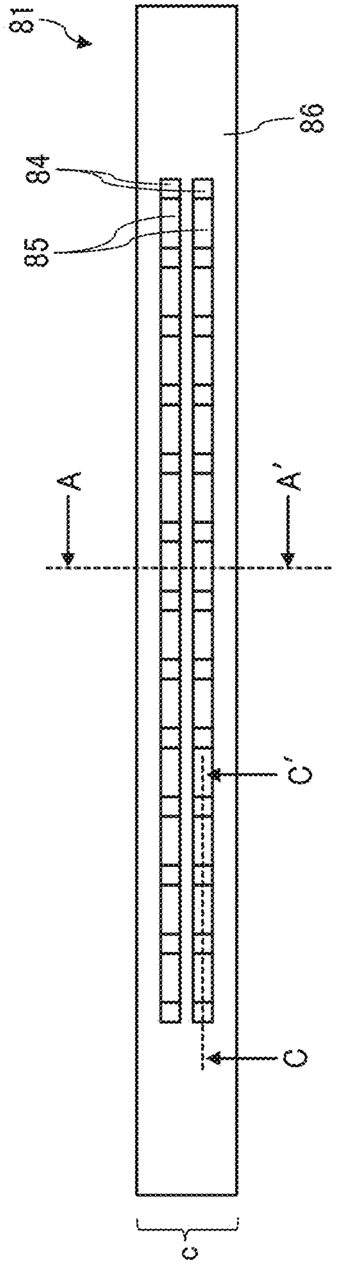
FIGS. 6A and 6B are schematic plan views of the vibration attenuator of FIG. 4 on the collection side, according to the first embodiment.
Figure 6B:
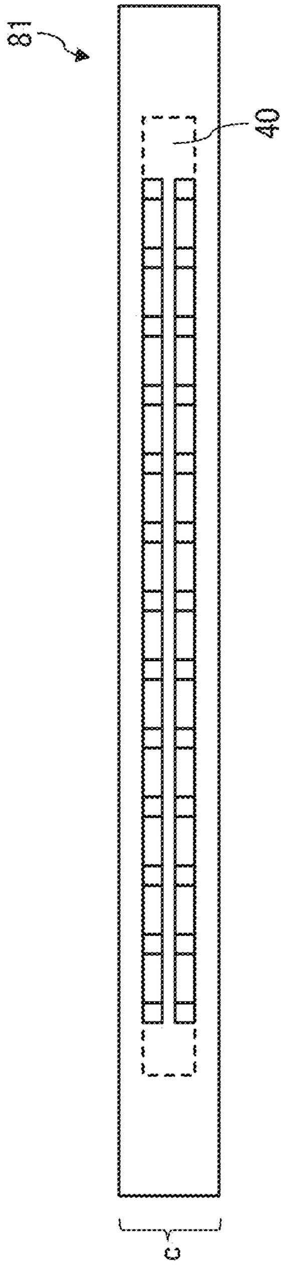

FIG. 6A is a schematic plan view of the vibration attenuator 81 in the collection-side common liquid chamber 40 corresponding to a portion c in FIG. 2. A cross-sectional view taken along line A-A' of FIG. 6A corresponds to the schematic cross-sectional view of FIG. 2. The dampers 85 illustrated in FIG. 6A are omitted in FIG. 2. The through holes 84 are also omitted in FIG. 2. FIG. 6B is another schematic plan view of the vibration attenuator 81, similar to the schematic plan view of FIG. 6A, illustrating the relative position between the collection-side common liquid chamber 40 and the vibration attenuator 81.

As illustrated in FIGS. 5A to 6B, the vibration attenuator 81 has multiple through holes 84. The multiple through holes 84 can prevent the fluid resistance of the common liquid chamber from increasing. For example, the through holes 84 pierce the vibration attenuator 81 in the direction orthogonal to the joint face between the frame 20 and the channel substrate 2.

In FIG. 2, the liquid in the supply-side common liquid chamber 10 flows in the direction away from the viewer or toward the viewer with respect to the surface of the paper on which FIG. 2 is drawn. The liquid flows into the individual liquid chambers through the through holes 84 while flowing in the upper and lower spaces with respect to the vibration attenuator 81 (in the upper space and lower space in FIG. 2) in the supply-side common liquid chamber 10. In the present embodiment, the through holes 84 each serve as a channel. As a result, the fluid resistance can be prevented from increasing. Similarly, the liquid in the collection-side common liquid chamber 40 flows in the direction away from the viewer or toward the viewer with respect to the surface of the paper on which FIG. 2 is drawn.

As illustrated in FIGS. 5A to 6B, the through holes 84 are arranged in a plane of the vibration attenuator 81. In FIGS. 5A to 6B, the through holes 84 are arranged in lines but are not limited thereto. For example, the through holes 84 may be arranged in a staggered manner.

The diameter of the through hole 84 can be appropriately selected and is preferably smaller than, for example, the diameter of the nozzle 4. In this case, the vibration attenuator 81 can function as a filter, so that, for example, foreign matter in the liquid can be removed. Thus, the nozzle 4 can be prevented from being clogged, and image quality by the liquid discharge head can be enhanced.

The compliance of the vibration attenuator 81 according to the present embodiment is described below. The vibration attenuator 81 has, for example, two types of functional effects as described above.

One of the functional effects is to reduce the pressure vibration due to a rapid change in flow rate caused by simultaneously discharging liquid from the multiple nozzles. In order to reduce the pressure vibration due to the rapid change in flow rate, preferably, the vibration attenuator 81 has a large compliance. Preferably, the compliance of the vibration attenuator 81 ranges, but not particularly limited to, approximately from $1\times10^{-12}$ to $1\times10^{-14}$ ($m^3$/Pa). Regarding the pressure vibration in the common liquid chamber, such as the vibration in the supply-side common liquid chamber and the vibration in the collection-side common liquid chamber, it is considered that the value of the compliance of the vibration attenuator 81 has a greater influence than the position of the vibration attenuator 81.

The other of the functional effects is to prevent the pressure vibration in the individual liquid chamber from propagating to another individual liquid chamber through the common liquid chamber (e.g., the supply-side common liquid chamber or the collection-side common liquid chamber). In order to prevent the pressure vibration from propagating, preferably, the compliance of the vibration attenuator 81 ranges, but not particularly limited to, approximately from $1\times10^{-15}$ to $1\times10^{-16}$ ($m^3$/Pa). The vibration attenuator 81 disposed far apart from the individual liquid chamber reduces the effect of preventing the pressure vibration in the individual liquid chamber from propagating. For this reason, the vibration attenuator 81 is preferably disposed close to the individual liquid chamber. Considering the above preferred range, the vibration attenuator 81 having any value of compliance for attenuating the pressure vibration in the common liquid chamber can attenuate the pressure vibration in the individual liquid chamber.

For example, a method for manufacturing the vibration attenuator 81 is similar to a method for manufacturing the diaphragm 3. The dampers 85 (e.g., a thin portion) is manufactured by nickel (Ni) electroforming or Ni-palladium (Pd) alloy electroforming. Then, a previously manufactured Ni component or steel use stainless (SUS) component is joined to the dampers 85 to manufacture the vibration attenuator 81. The manufactured vibration attenuator 81 is joined to the frame 20 to obtain the liquid discharge head 100 including the vibration attenuator 81 in the common liquid chamber.

Figure 7:
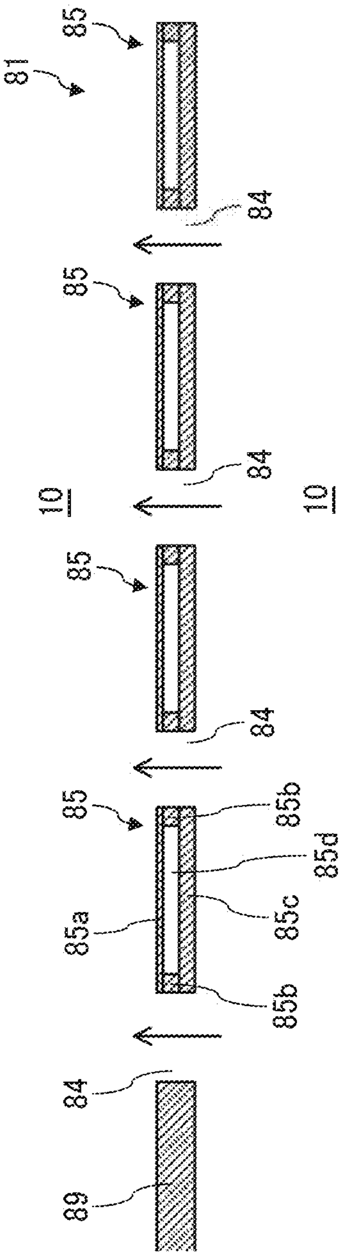
FIG. 7 is a schematic cross-sectional view of the vibration attenuator of FIG. 5A on the supply side, according to the first embodiment.
Figure 8:
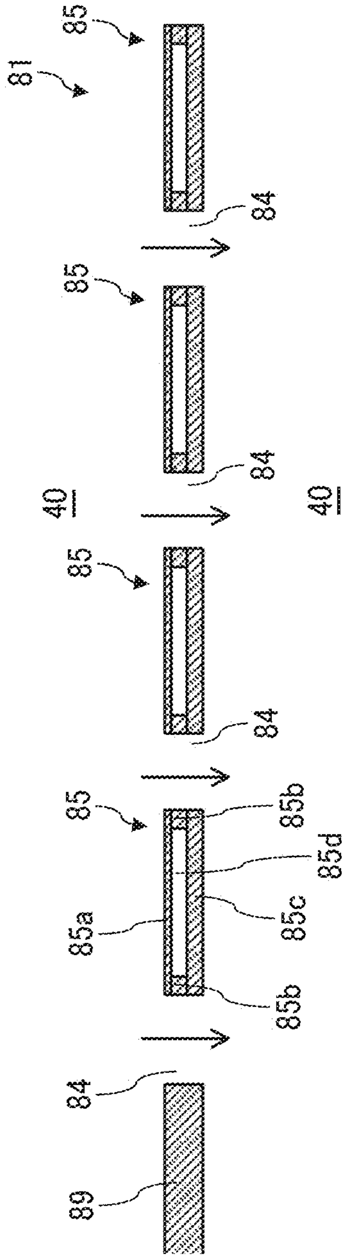
FIG. 8 is a schematic cross-sectional view of the vibration attenuator of FIG. 6A on the collection side, according to the first embodiment.

In the dampers 85 as illustrated in FIGS. 7 and 8, which are described later, for example, a thin portion 85*a* (i.e., a first thickness portion) and a damper partition 85*b* can be manufactured by Ni electroforming, and a thick portion 85*c* (i.e., a second thickness portion) may be manufactured by any method. As described above, the previously manufactured Ni component or SUS component may be used as the thick portion 85*c*.

Examples of the method for manufacturing the vibration attenuator 81 include etching a component made of resin and SUS. A SUS plate coated with resin is etched to obtain the vibration attenuator 81 including a resin part that is a low hardness material and a SUS part that is a high hardness material. For example, the resin part corresponds to the damper 85 (e.g., the thin portion). In the damper 85 as illustrated in FIGS. 7 and 8, which is described later, the resin part can serve as the thin portion 85*a* and the SUS part can serve as the other portion in the damper 85. The component made of resin and SUS may be etched and then the previously manufactured Ni component or SUS component may be joined to the etched component to obtain the vibration attenuator 81.

The vibration attenuator 81 according to the present embodiment includes the through holes 84 and the dampers 85 arranged two-dimensionally, in which the dampers 85 each include the thin portion. Examples of the arrangement of the through holes 84 and the dampers 85 include an arrangement in which the through holes 84 and the dampers 85 are alternately disposed as illustrated in FIGS. 5A to 6B. Since the vibration attenuator 81 includes the multiple dampers 85 each including the thin portion, the vibration attenuator 81 has a large compliance. Such a configuration can facilitate the attenuation of the pressure vibration in the common liquid chamber.

Since the through holes 84 and the dampers 85 are alternately arranged, an effect of attenuating the pressure vibration can be prevented from being unbalanced in the vibration attenuator 81. Since the through holes 84 and the dampers 85 are alternately arranged, even when the common liquid chamber is planar in shape, the pressure vibration in the common liquid chamber can be effectively attenuated. Preferably, the thin portion is formed of the low hardness material described above.

The damper 85 is described below with reference to FIG. 7. FIG. 7 is a schematic cross-sectional view of a part of the vibration attenuator 81, corresponding to a cross-sectional view taken along line B-B' of FIG. 5A. Arrows in FIG. 7 schematically indicate the direction of the liquid flowing in the common liquid chamber. The individual liquid chamber is located above the vibration attenuator 81 in FIG. 7. FIG. 7 illustrates, for example, a common liquid chamber of the non-circulation type liquid discharge head or the supply-side common liquid chamber 10 of the circulation type liquid discharge head.

As illustrated in FIG. 7, the damper 85 according to the present embodiment includes the thin portion 85*a*, the damper partition 85*b*, the thick portion 85*c* facing the thin portion 85*a*, and an air layer 85*d* that is surrounded by the thin portion 85*a*, the damper partition 85*b*, and the thick portion 85*c* and ensures a deformable region of the thin portion 85*a*. With such a configuration, the compliance of the vibration attenuator 81 is hardly affected by the liquid in the common liquid chamber. For example, since the air layer 85*d* ensures the deformable region of the thin portion 85*a*, the effect of attenuating the pressure vibration can be maintained easily.

In the present embodiment, preferably, the thin portion 85*a* has a face parallel to or substantially parallel to the joint face between the frame 20 and the channel substrate 2 and is disposed closer to the individual liquid chamber than the thick portion 85*c*. Due to such a configuration, the damper 85 has a large compliance. The thin portion 85*a* having such a configuration facilitates the attenuation of the pressure vibration in the individual liquid chamber.

Examples of a method for manufacturing the damper 85 including the thin portion 85*a*, the damper partition 85*b*, the thick portion 85*c*, and the air layer 85*d* as illustrated in FIG. 7 includes joining a lid plate to a component having projections and recesses (e.g., the Ni component or the resin SUS component described above).

In the present embodiment, preferably, the thin portion 85*a* has a compliance larger than a compliance of the air layer 85*d*. In this case, compliance can be ensured due to the compressibility of the air layer 85*d*, so that the pressure vibration in the common liquid chamber can be attenuated easier.

The compliance of the thin portion 85*a* can be calculated based on the dimensions and material of the thin portion 85*a*. Alternatively, the compliance of the thin portion 85*a* can be calculated based on a variation in the volume of the air layer 85*d* when the pressure is applied to the thin portion 85*a*. The compliance of the thin portion 85*a* can be obtained by the following expression: variation in volume Q=compliance C×pressure P. The compliance of the air layer 85*d* can be calculated based on the compressibility of air and the volume of the air layer 85*d*.

In the present embodiment, preferably, the air layer 85*d* is in communication with the atmosphere. However, the air layer 85*d* is not necessarily in communication with the atmosphere. The air layer 85*d* in the present embodiment is in communication with the atmosphere. Since the air layer 85*d* is in communication with the atmosphere, the compliance of the vibration attenuator 81 is hardly influenced by the air layer 85*d*. As a result, the vibration attenuator 81 can have a larger compliance.

This reason is described below. When the air layer is a sealed space, i.e., when the air layer is not in communication with the atmosphere, the compliance of the vibration attenuator 81 is dominated by the compliance of the air layer. Typically, the thin portion 85*a* has a compliance larger than a compliance of the air layer. Accordingly, when the air layer is a sealed space, the compliance of the vibration attenuator 81 is determined by the compliance of the air layer and additionally the vibration attenuator 81 has hardly a large compliance.

Thus, due to the air layer 85*d* in communication with the atmosphere, the compliance of the vibration attenuator 81 is hardly influenced by the compliance of the air layer. Thus, the vibration attenuator 81 has a large compliance which is determined by the compliance of the thin portion 85*a*. Thus, the vibration attenuator 81 can easily deal with a rapid change in flow rate in the common liquid chamber.

In order to make the air layer 85*d* in communication with the atmosphere, for example, when the damper 85 is manufactured, a path for communication between the air layer 85*d* and the atmosphere is formed.

Preferably, the thin portion 85*a* has a hardness lower than a hardness of the damper partition 85*b*. In this case, the thin portion 85*a* has a large compliance. Thus, the pressure vibration can be easily attenuated. In order to make the thin portion 85*a* lower in hardness than the damper partition 85*b*, for example, the thin portion 85*a* is formed of a low hardness material. Such a low hardness material is, for example, a material lower in hardness than the material of the damper partition 85*b*. Examples of the low hardness material include resin as described in the above manufacturing method. For example, the thin portion 85*a* is formed of resin and the damper partition 85*b* is formed of SUS, so that the above hardness relation can be satisfied.

FIG. 8 is a schematic cross-sectional view of a part of the vibration attenuator 81, corresponding to a cross-sectional view taken along line C-C' of FIG. 6A. Arrows in FIG. 8 schematically indicate the direction of the liquid flowing in the common liquid chamber. The individual liquid chamber is located above the vibration attenuator 81 in FIG. 8. FIG. 8 illustrates, for example, the collection-side common liquid chamber 40 of the circulation type liquid discharge head.

As illustrated in FIG. 8, in the circulation type liquid discharge head, preferably, the thin portion 85*a* is disposed closer to the individual liquid chamber than the thick portion 85*c*. The thin portion 85*a* having such a configuration facilitates the attenuation of the pressure vibration in the individual liquid chamber.

Figure 9A:
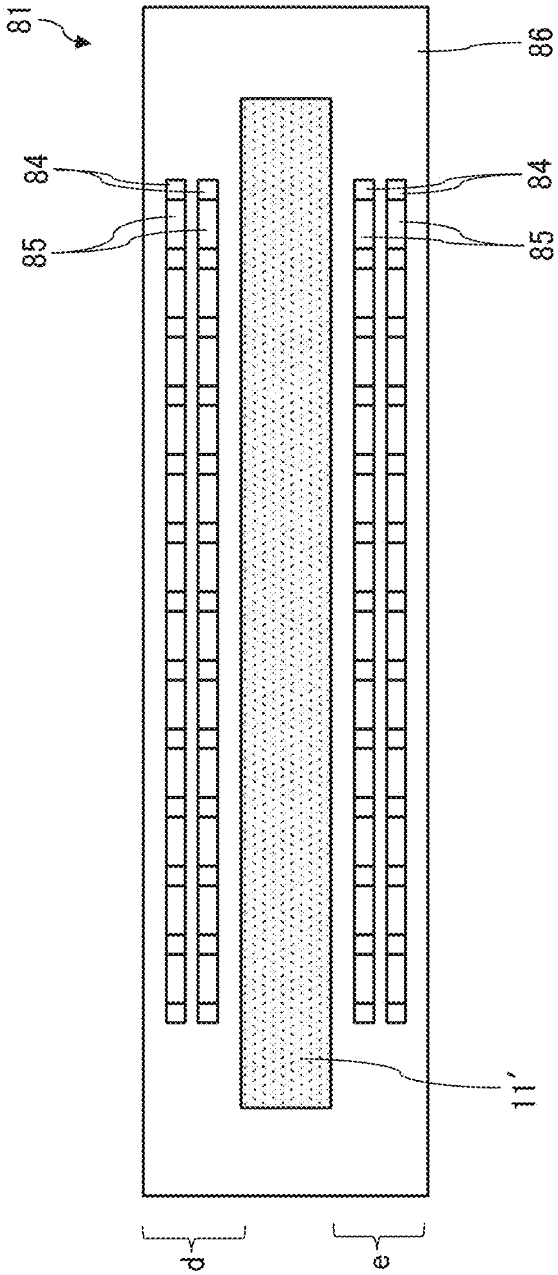
FIG. 9A is a schematic plan view of another vibration attenuator according to the first embodiment.
Figure 9B:
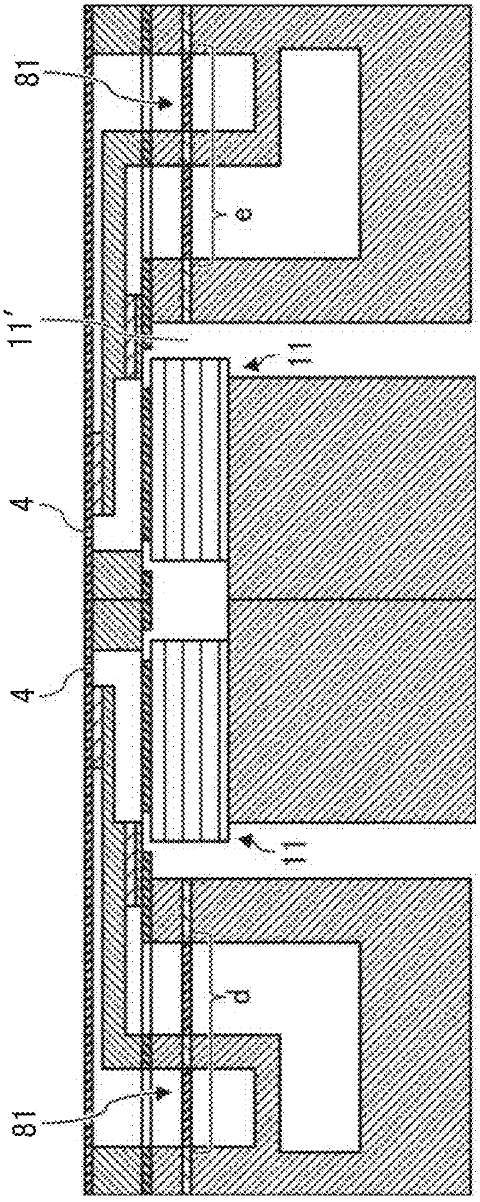
FIG. 9B is a schematic cross-sectional view of a liquid discharge head including the vibration attenuator of FIG. 9A.

FIG. 9A is a schematic plan view of another vibration attenuator 81 according to the present embodiment. FIG. 9B is a schematic cross-sectional view of a liquid discharge head including the vibration attenuator 81 of FIG. 9A. A portion d and a portion e in FIG. 9A correspond to a portion d and a portion e in FIG. 9B, respectively. As illustrated in FIGS. 9A and 9B, an opening 11' is provided so as to arrange the piezoelectric actuators 11. As illustrated in FIGS. 9A and 9B, the piezoelectric actuators 11 are disposed in the opening 11'. For example, in accordance with the arrangement of the piezoelectric actuators 11, the vibration attenuator 81 can be appropriately changed in configuration.

The vibration attenuator 81 to be manufactured can be appropriately selected. For example, the vibration attenuator 81 illustrated in FIG. 9A may be manufactured as a single component. In this case, the vibration attenuator 81 illustrated in FIG. 9B is manufactured as the single component. Alternatively, the vibration attenuator 81 illustrated in FIG. 9A may include two components, on the upper side and lower side in FIG. 9A, coupled together. In this case, the vibration attenuator 81 includes a left part and a right part in FIG. 9B which are coupled together. Alternatively, the supply-side part illustrated in FIGS. 5A and 5B and the collection-side part illustrated in FIGS. 6A and 6B may be coupled together to form the vibration attenuator 81.

Second Embodiment

A vibration attenuator according to another embodiment of the present disclosure is described below. Descriptions of items similar to the items in the above-described embodiments are omitted. A liquid discharge head according to the present embodiment includes a vibration attenuator 81 different in configuration from the vibration attenuator 81 described in the above embodiment.

In the present embodiment, the vibration attenuator 81 has a face along the joint face between the frame 20 and the channel substrate 2. When the direction orthogonal to the face is identical to a thickness direction of the vibration attenuator 81, the vibration attenuator 81 has two regions, excluding the through holes 84, different in thickness in the thickness direction. The thickness direction is also identical to the liquid discharge direction.

In the above-described embodiment, the vibration attenuator 81 includes the damper 85 including the thin portion 85*a*, the damper partition 85*b*, the thick portion 85*c*, and the air layer 85*d*, but a vibration attenuator according to an embodiment of the present disclosure is not limited thereto. The vibration attenuator 81 according to the present embodiment has two regions different in thickness in the thickness direction. For example, the two regions are referred to as a thin region and a thick region. The thin region deforms to attenuate the pressure vibration. In the present embodiment, the vibration attenuator 81 can be easily manufactured.

Figure 10:
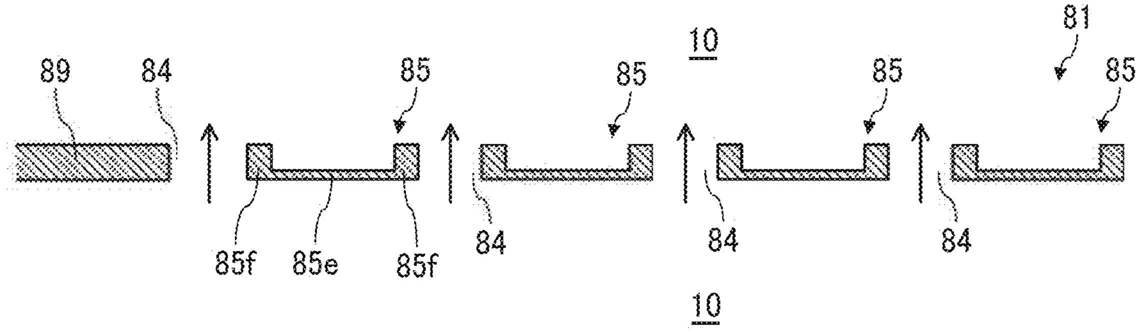
FIG. 10 is a schematic cross-sectional view of a vibration attenuator according to a second embodiment of the present disclosure.

A schematic plan view of the vibration attenuator 81 according to the present embodiment is similar to the schematic plan views of FIGS. 5A to 6B. FIG. 10 is a schematic cross-sectional view of the vibration attenuator 81 according to the present embodiment. FIG. 10 is similar to the schematic cross-sectional view of FIG. 7 or 8. As illustrated in FIG. 10, the vibration attenuator 81 according to the present embodiment has a thin region 85*e* and a thick region 85*f*. The vibration attenuator 81 having such a configuration can attenuate the pressure vibration.

In FIG. 10, the vibration attenuator 81 has recesses that open toward the individual liquid chamber in cross section, but may have recesses that open toward the opposite side of the individual liquid chamber.

The configuration in the above embodiment can be applied to the present embodiment, which is described below. For example, preferably, the thin region 85*e* has a hardness lower than a hardness of the thick region 85*f*.

The thin region 85*e* can be formed of resin and the thick region 85*f* can be formed of SUS. For example, the thin region 85*e* and the thick region 85*f* can be manufactured by etching a component made of resin and SUS.

Third Embodiment

A vibration attenuator according to another embodiment of the present disclosure is described below. Descriptions of items similar to the items in the above-described embodiments are omitted. In the present embodiment, the common liquid chamber includes a mainstream section and a branch section branching from the mainstream section. In a liquid discharge head including nozzles disposed two-dimensionally, a common liquid chamber includes a mainstream section and a branch section, so that liquid can smoothly reach each nozzle. The mainstream section may be referred to as a mainstream and the branch section may be referred to as a branch.

In the present embodiment, the common liquid chamber includes the mainstream section and multiple branch sections that branch from the mainstream section. The multiple branch sections are disposed closer to the individual liquid chamber than the mainstream section. The vibration attenuator is disposed in the branch sections.

Since the vibration attenuator is disposed in the branch sections, the vibration attenuator is disposed close to the individual liquid chamber. In the present embodiment, the vibration attenuator has through holes, so that the fluid resistance of the branch sections can be prevented from increasing. Thus, with the configuration according to the present embodiment, the pressure vibration in the individual liquid chamber can be attenuated. In addition, the pressure loss due to an increase in the fluid resistance of the common liquid chamber can be prevented, and the discharge failure of the liquid discharge head due to the supply shortage can be prevented.

Figure 11:
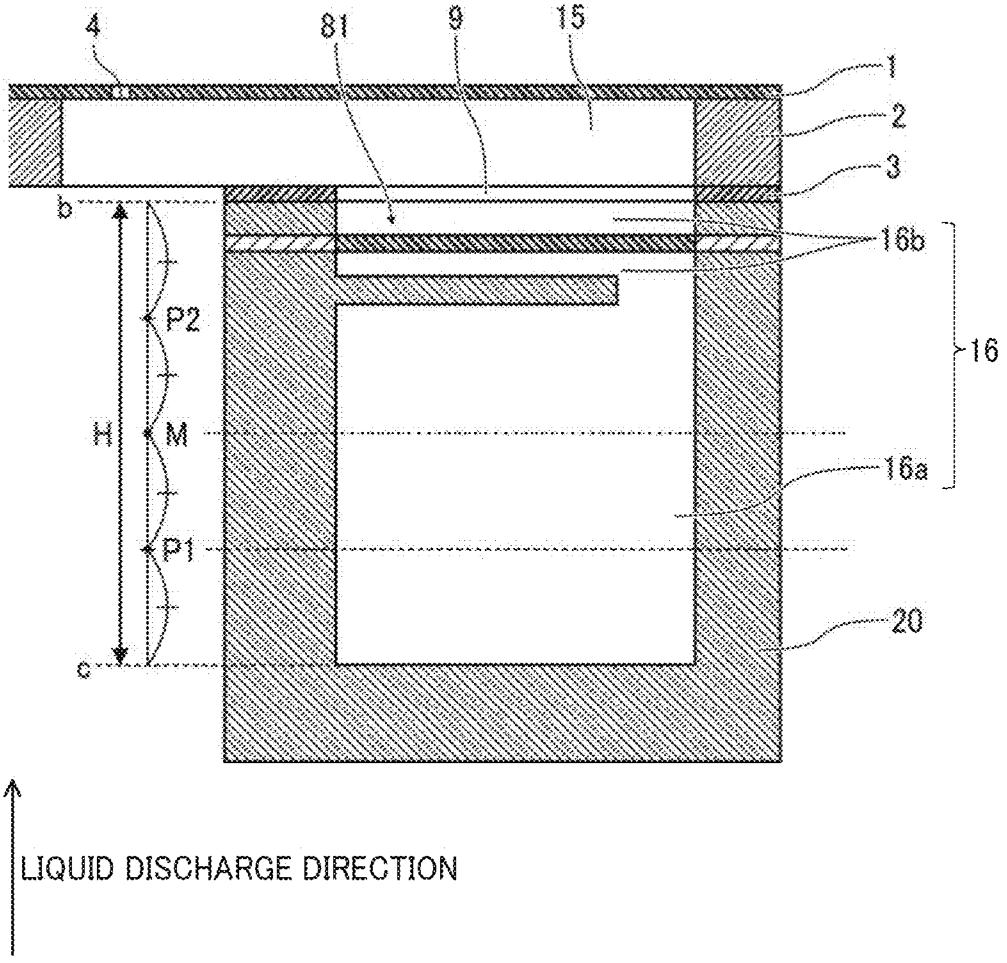
FIG. 11 is a schematic cross-sectional view of a liquid discharge head illustrating the arrangement of a vibration attenuator according to a third embodiment of the present disclosure.

A liquid discharge head according to the present embodiment is described below with reference to FIG. 11. FIG. 11 is a schematic cross-sectional view of the liquid discharge head according to the present embodiment. FIG. 11 is similar to the schematic cross-sectional view of FIG. 3. The individual liquid chamber 15 is simplified in FIG. 11

As illustrated in FIG. 11, a common liquid chamber 16 according to the present embodiment includes a mainstream section 16*a* and multiple branch sections 16*b*. The branch sections 16*b* are disposed closer to the individual liquid chamber 15 than the mainstream section 16*a*. The branch sections 16*b* branch from the mainstream section 16*a* and correspond one-to-one to the individual liquid chambers 15. In the cross-sectional view of FIG. 11, a single branch section 16*b* is illustrated. The common liquid chamber 16 includes the multiple branch sections 16*b*, which are omitted in FIG. 11.

The vibration attenuator 81 is disposed in the branch section 16*b*. Thus, the pressure vibration in the individual liquid chamber 15 can be attenuated, so that the pressure vibration in the individual liquid chamber 15 can be prevented from propagating to another individual liquid chamber 15. In the present embodiment, the pressure vibration in the common liquid chamber 16 can also be attenuated. In particular, the pressure vibration in the branch sections 16*b* can be preferably attenuated.

As illustrated in FIG. 11, in the present embodiment, the vibration attenuator 81 is disposed, in the common liquid chamber, at a predetermined position between one end and the other end of the common liquid chamber in the liquid discharge direction of the liquid discharge head. Similarly to the above-described embodiment, there is a preferred positional range for the vibration attenuator 81.

Preferably, the vibration attenuator 81 is disposed closer to the individual liquid chamber than the point P1 at the three quarters of the common-liquid-chamber height H from the individual liquid chamber side. Preferably, the vibration attenuator 81 is disposed closer to the individual liquid chamber than the middle point M. More preferably, the vibration attenuator 81 is disposed closer to the individual liquid chamber than the point P2 at the quarter of the common-liquid-chamber height H from the individual liquid chamber side. Preferably, the vibration attenuator 81 is disposed away from the individual liquid chamber by more than one-tenth of the common-liquid-chamber height H.

In the present embodiment, since the common liquid chamber includes the multiple branch sections 16*b*, the common-liquid-chamber height H may have multiple values. This is because the common liquid chamber 16 has multiple other ends (i.e., the end c in FIG. 11). The multiple common-liquid-chamber heights H for the multiple branch sections 16*b* may be obtained and then the position of the vibration attenuator 81 may be determined. Alternatively, an average value may be obtained based on the multiple common-liquid-chamber heights H for some of the multiple branch sections 16*b* and then the position of the vibration attenuator 81 may be determined based on the average value. Alternatively, a maximum value or a minimum value may be obtained based on the multiple common-liquid-chamber heights H for some of the multiple branch sections 16*b* and then the position of the vibration attenuator 81 may be determined based on the maximum value or the minimum value. Regarding the common-liquid-chamber height H, the multiple values obtained for the multiple branch sections 16*b* may be used for the multiple branch sections 16*b*, respectively, or the same single value may be used for all the multiple branch sections 16*b*.

Figure 13:
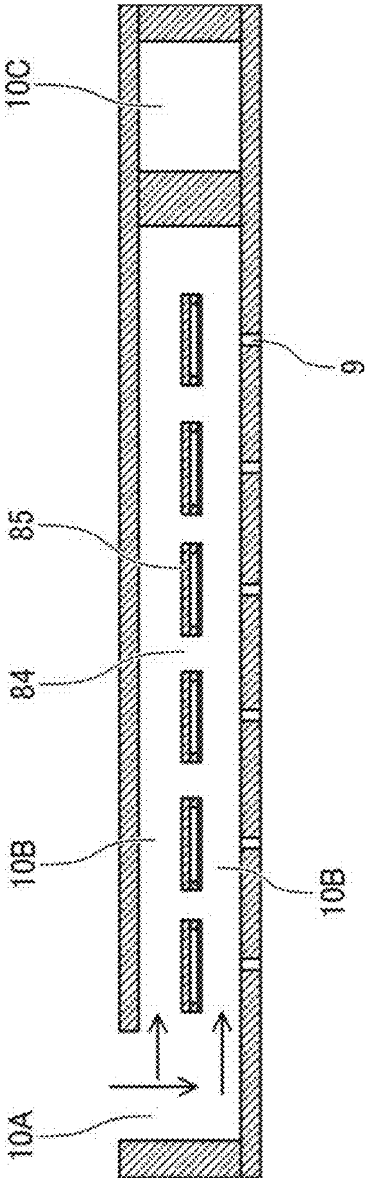
FIG. 13 is a schematic cross-sectional view of the vibration attenuator of FIG. 12 on the supply side, according to the fourth embodiment.

The items described in the above-described embodiments can be applied to the configuration of the vibration attenuator 81. For example, the vibration attenuator 81 according to the present embodiment can have such a cross-sectional configuration as illustrated in FIG. 13, which is described later. The vibration attenuator 81 according to the present embodiment also has the through holes 84.

Such a configuration in which the common liquid chamber includes the mainstream section and the branch sections as in the present embodiment can be applied to the circulation type liquid discharge head or the non-circulation type liquid discharge head. Such a configuration applied to the circulation type liquid discharge head is described in the following embodiment.

Fourth Embodiment

A vibration attenuator according to another embodiment of the present disclosure is described below. Descriptions of items similar to the items in the above-described embodiments are omitted. A liquid discharge head according to the present embodiment serves as the circulation type liquid discharge head and includes the common liquid chamber including the mainstream section and the branch section. The liquid discharge head according to the present embodiment has the following features.

The common liquid chamber includes the supply-side common liquid chamber for supplying liquid to the individual liquid chamber and the collection-side common liquid chamber for collecting the liquid from the individual liquid chamber.

The supply-side common liquid chamber includes a supply mainstream section and multiple supply branch sections that branch from the supply mainstream section. The multiple supply branch sections are disposed closer to the individual liquid chamber than the supply mainstream section.

The collection-side common liquid chamber includes a collection mainstream section and multiple collection branch sections that branch from the collection mainstream section. The multiple collection branch sections are disposed closer to the individual liquid chamber than the collection mainstream section.

The vibration attenuator is disposed in the supply branch sections and the collection branch sections. The liquid discharge head according to the present embodiment serving as the circulation type liquid discharge head has a function of attenuating the pressure vibration with the vibration attenuator. The supply branch sections and the collection branch sections are each provided with the vibration attenuator. Furthermore, the vibration attenuator is disposed close to the individual liquid chamber. Thus, the pressure vibration in the individual liquid chamber can be attenuated on the supply side and on the collection side.

Figure 12:
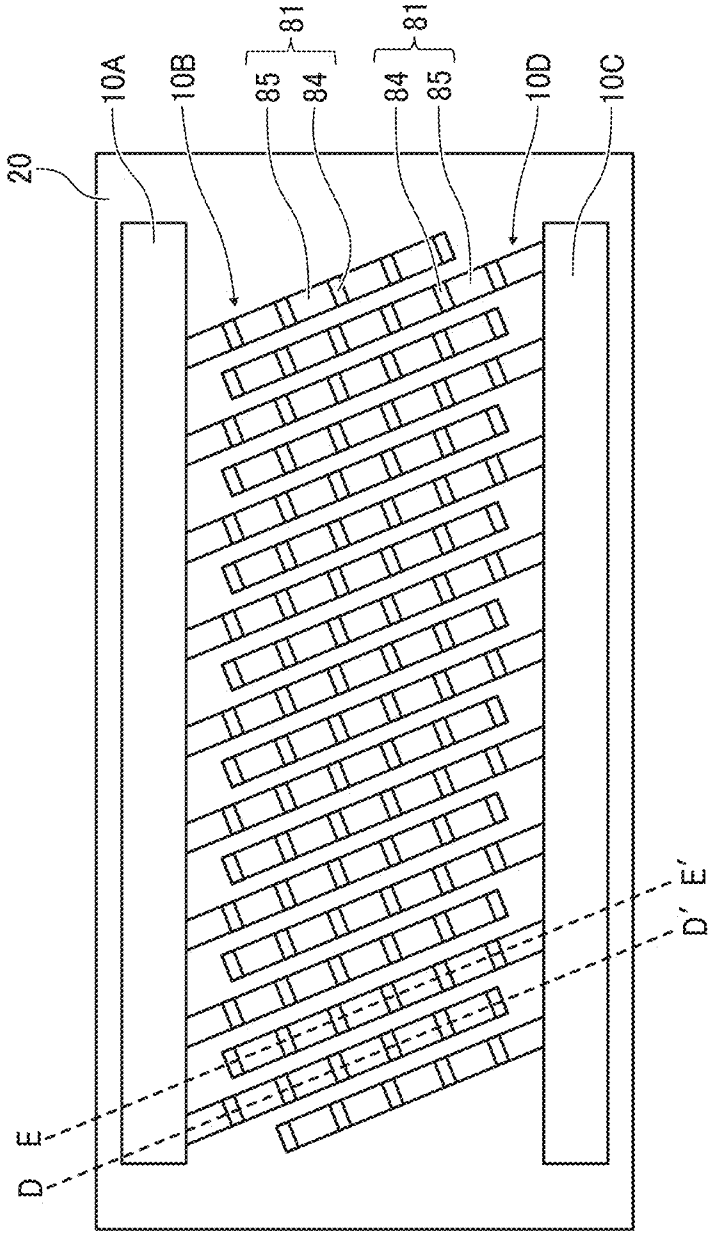
FIG. 12 is a schematic plan view of a part of a liquid discharge head according to a fourth embodiment of the present disclosure.

FIG. 12 is a schematic plan view of the liquid discharge head according to the present embodiment, illustrating the configuration of the common liquid chamber. The nozzles, which are omitted in FIG. 12, are disposed two-dimensionally.

As illustrated in FIG. 12, the liquid discharge head according to the present embodiment includes a supply-side common liquid chamber mainstream section 10A, supply-side common liquid chamber branch sections 10B, a collection-side common liquid chamber mainstream section 10C, and collection-side common liquid chamber branch sections 10D. The multiple supply-side common liquid chamber branch sections 10B branch from the supply-side common liquid chamber mainstream section 10A. The multiple collection-side common liquid chamber branch sections 10D branch from the collection-side common liquid chamber mainstream section 10C. In the liquid discharge head according to the present embodiment that serves as the circulation type liquid discharge head, liquid circulates through the supply-side common liquid chamber mainstream section 10A, the multiple supply-side common liquid chamber branch sections 10B, the multiple collection-side common liquid chamber branch sections 10D, and the collection-side common liquid chamber mainstream section 10C in this order.

FIG. 13 is a schematic cross-sectional view of the liquid discharge head taken along line D-D' of FIG. 12, illustrating the vibration attenuator 81 in the supply-side common liquid chamber (i.e., the supply-side common liquid chamber mainstream section 10A and the multiple supply-side common liquid chamber branch sections 10B). Referring to FIG. 13, the direction of the liquid flowing in the supply-side common liquid chamber is schematically indicated by arrows. The individual liquid chamber is disposed on the lower side in FIG. 13. Thus, the liquid discharge head is illustrated upside down in FIG. 13 as compared to, for example, FIG. 2.

As described in the above embodiments, since the vibration attenuator 81 is disposed close to the individual liquid chamber, the pressure vibration in the individual liquid chamber can be attenuated, so that the pressure vibration in the individual liquid chamber can be prevented from propagating to another individual liquid chamber. In the present embodiment, the vibration attenuator 81 can prevent the discharge failure of the liquid discharge head due to the pressure loss. In the present embodiment, the vibration attenuator 81 has through holes 84, so that the value of fluid resistance of the common liquid chamber, in particular, the value of fluid resistance of the branch section of the common liquid chamber can be reduced. Thus, an effect of attenuating the pressure vibration and a reduction in the pressure loss can both be achieved.

As illustrated in FIG. 13, the damper 85 has the thick portion and the thin portion, and the thin portion is preferably disposed closer to the individual liquid chamber than the thick portion. In FIG. 13, the damper 85 has the air layer. Similarly to the above-described embodiments, the air layer may be in communication with the atmosphere. Similarly to the above-described embodiments, the configuration of the vibration attenuator 81 can be appropriately selected. The items described in the third embodiment, such as the items described with reference to FIG. 11, can be applied to the position of the vibration attenuator 81.

FIG. 14 is a schematic cross-sectional view of the liquid discharge head taken along line E-E' of FIG. 12, illustrating the vibration attenuator 81 in the collection-side common liquid chamber (i.e., the collection-side common liquid chamber mainstream section 10C and the multiple collection-side common liquid chamber branch sections 10D). Referring to FIG. 14, the direction of the liquid flowing in the collection-side common liquid chamber is schematically indicated by arrows. The individual liquid chamber is disposed on the lower side in FIG. 14. Thus, the liquid discharge head is illustrated upside down in FIG. 14 as compared to, for example, FIG. 2.

According to the present embodiment, since the vibration attenuator 81 is also disposed in the collection-side common liquid chamber branch sections 10D, the liquid discharge head serving as the circulation type liquid discharge head can sufficiently attenuate the pressure vibration in the individual liquid chamber.

In the present embodiment and the third embodiment, since the vibration attenuator is disposed in the branch sections of the common liquid chamber, the branch sections preferably have a sufficient height.

A second comparative example, which is not included in embodiments of the present disclosure, is described below. FIG. 15 is a schematic plan view of a liquid discharge head according to the second comparative example, illustrating the configuration of the common liquid chamber. FIG. 15 is similar to the plan view of FIG. 12. FIG. 16 is a schematic cross-sectional view of the liquid discharge head taken along line F-F' of FIG. 15. FIG. 16 is similar to the cross-sectional view of FIG. 13.

As illustrated in FIG. 15, the liquid discharge head according to the second comparative example also includes the supply-side common liquid chamber mainstream section 10A, the supply-side common liquid chamber branch sections 10B, the collection-side common liquid chamber mainstream section 10C, and the collection-side common liquid chamber branch sections 10D. The multiple supply-side common liquid chamber branch sections 10B branch from the supply-side common liquid chamber mainstream section 10A. The multiple collection-side common liquid chamber branch sections 10D branch from the collection-side common liquid chamber mainstream section 10C.

In the second comparative example, as illustrated in FIG. 16, a vibration attenuator 81*b* is disposed on the top of the supply-side common liquid chamber branch section 10B. The vibration attenuator 81*b* according to the second comparative example includes a thin portion 87*a* that is a thin-film member and an air layer 87*b* that ensures a deformable region of the thin portion 87*a*. The vibration attenuator 81*b* according to the second comparative example has no through hole.

In order to prevent the pressure vibration in the individual liquid chamber from propagating to an adjacent individual liquid chamber, the height of the branch section is reduced and the distance between the individual liquid chamber and the vibration attenuator 81*b* is reduced.

However, as in the second comparative example, when the distance between the individual liquid chamber and the vibration attenuator 81*b* is reduced, the value of fluid resistance of the branch section increases, and the pressure loss increases. Thus, the variations in pressure occur between the respective meniscuses of the nozzles 4, and the variations in the liquid discharge may occur. On the other hand, in the present embodiment and the third embodiment, the variations in the liquid discharge can be prevented. As a result, the liquid discharge head can discharge liquid satisfactorily.

Fifth Embodiment

A vibration attenuator according to another embodiment of the present disclosure is described below. Descriptions of items similar to the items in the above-described embodiments are omitted. A liquid discharge head according to the present embodiment vibrates a nozzle plate to discharge liquid from the individual liquid chamber. The liquid discharge head according to the present embodiment includes the nozzle plate having nozzles disposed two-dimensionally. The common liquid chamber does not include the mainstream section and the branch sections. The liquid discharge head is not the circulation type liquid discharge head.

Figure 17:
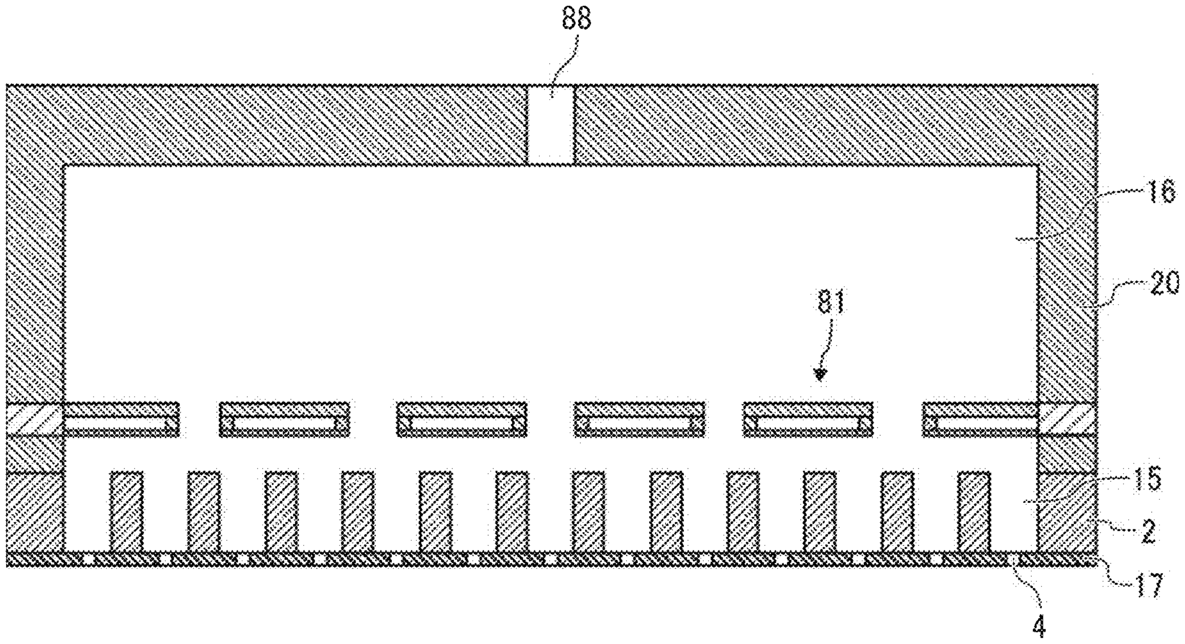
FIG. 17 is a schematic cross-sectional view of a liquid discharge head according to a fifth embodiment of the present disclosure.

The liquid discharge head according to the present embodiment is described with reference to FIGS. 17 to 20. FIG. 17 is a schematic cross-sectional view of the liquid discharge head according to the present embodiment. In the present embodiment, liquid is supplied to the common liquid chamber 16 through a liquid supply port 88. Then, the liquid is supplied from the common liquid chamber 16 to each individual liquid chamber 15. The liquid supplied to each individual liquid chamber 15 is discharged through the nozzle 4 in response to vibration of a nozzle plate 17. The nozzle plate 17 is provided with a piezoelectric actuator around each nozzle 4. The piezoelectric actuator is omitted in FIG. 17.

Figure 18:
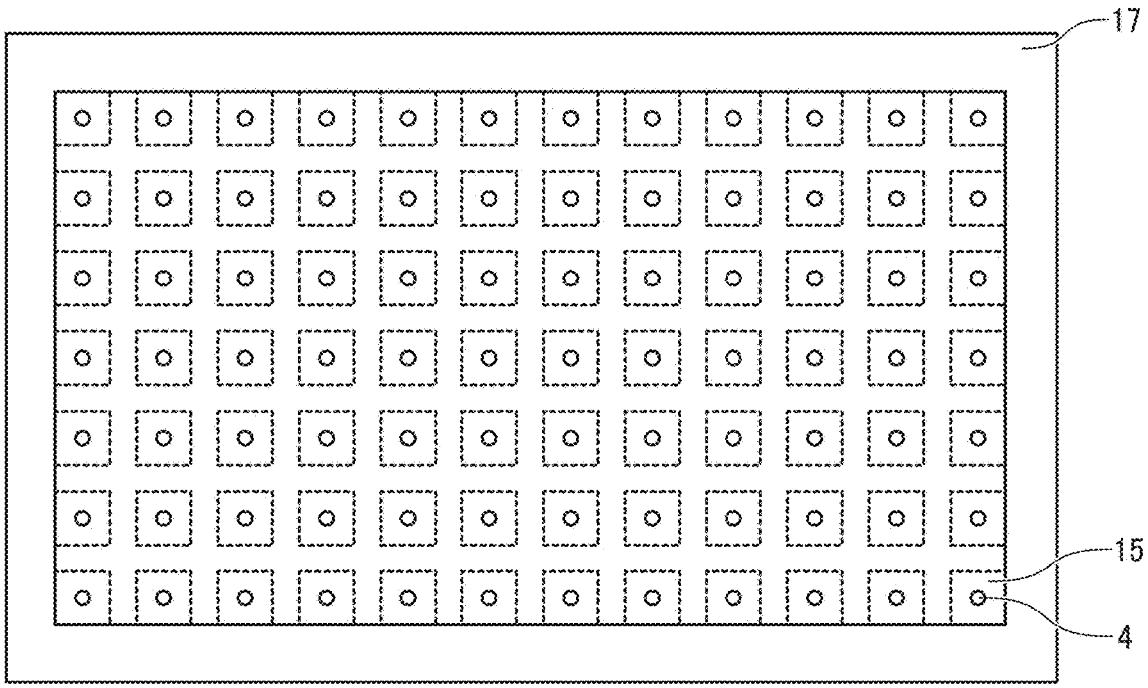
FIG. 18 is a schematic plan view of a nozzle plate of the liquid discharge head of FIG. 17, according to the fifth embodiment.

FIG. 18 is a schematic plan view of the liquid discharge head according to the present embodiment as viewed from the nozzle side. As illustrated in FIG. 18, the nozzle plate 17 has the nozzles 4 disposed two-dimensionally. The individual liquid chambers 15 are provided corresponding one-to-one to the nozzles 4. The piezoelectric actuator is also omitted in FIG. 18. The shape of each individual liquid chamber is illustrated schematically.

Figure 19:
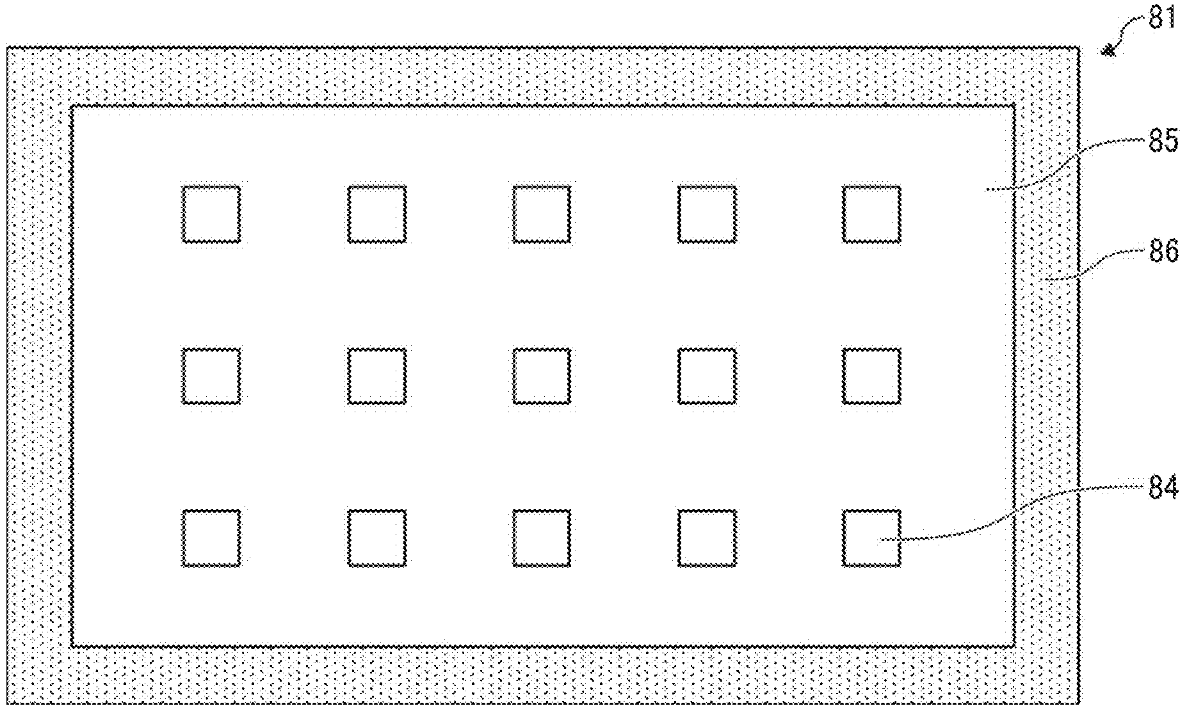
FIG. 19 is a schematic plan view of a vibration attenuator of the liquid discharge head of FIG. 17, according to the fifth embodiment.

FIG. 19 is a schematic plan view of the vibration attenuator 81 according to the present embodiment. As illustrated in FIG. 19, the vibration attenuator 81 has multiple through holes 84. In FIG. 19, the vibration attenuator 81 includes the damper 85. Similarly to the above-described embodiments, the damper 85 may include, for example, the thin portion and may include the air layer.

Figure 20:
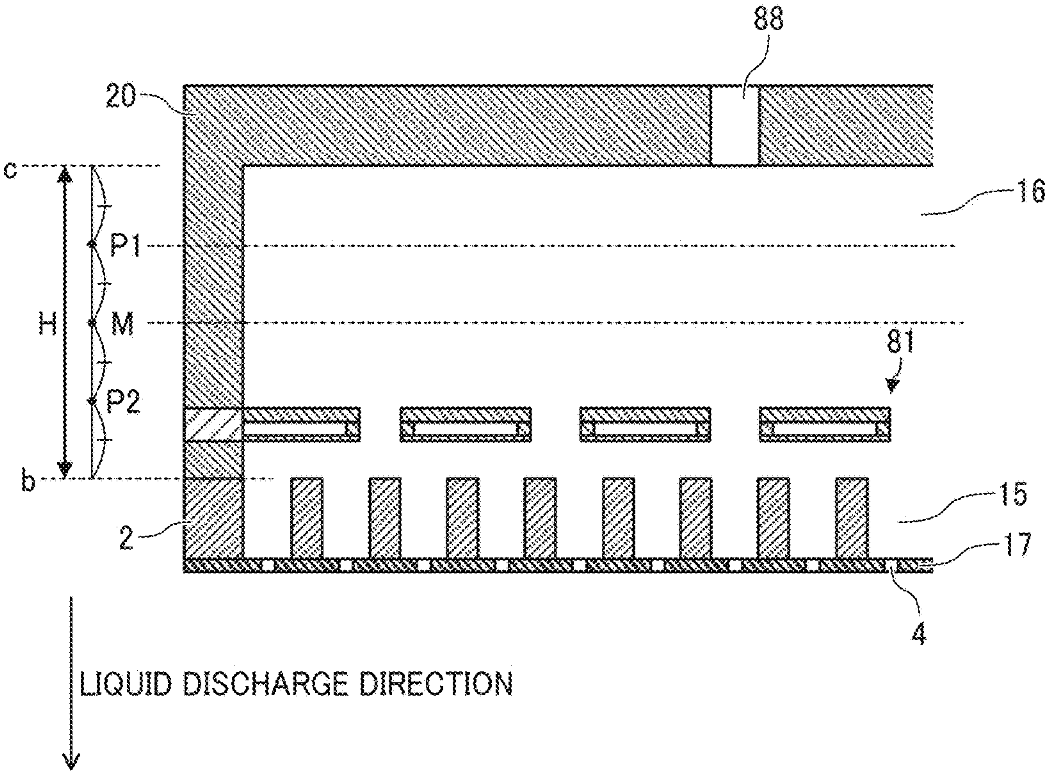
FIG. 20 is a schematic cross-sectional view of the liquid discharge head of FIG. 17 illustrating the arrangement of the vibration attenuator, according to the fifth embodiment.

FIG. 20 is a schematic cross-sectional view of the liquid discharge head according to the present embodiment, illustrating a part of the liquid discharge head in the schematic cross-sectional view of FIG. 17. As illustrated in FIGS. 17 and 20, in the present embodiment, the vibration attenuator 81 is disposed, in the common liquid chamber, at a predetermined position between one end and the other end of the common liquid chamber in the liquid discharge direction of the liquid discharge head. In the present embodiment, the pressure vibration in the individual liquid chamber 15 can be prevented from propagating to another individual liquid chamber 15. The vibration attenuator 81 having the through holes 84 does not hinder the flow of the liquid in the common liquid chamber 16, can reduce the pressure loss, and can prevent the discharge failure due to the pressure loss. Thus, the effect of attenuating the pressure vibration and the reduction in the pressure loss can both be achieved. As a result, the liquid discharge head can discharge liquid satisfactorily.

Similarly to the above-described embodiments, there is a preferred positional range for the vibration attenuator 81. Preferably, the vibration attenuator 81 is disposed closer to the individual liquid chamber than the point P1 at the three quarters of the common-liquid-chamber height H from the individual liquid chamber side. Preferably, the vibration attenuator 81 is disposed closer to the individual liquid chamber than the middle point M. More preferably, the vibration attenuator 81 is disposed closer to the individual liquid chamber than the point P2 at the quarter of the common-liquid-chamber height H from the individual liquid chamber side. Preferably, the vibration attenuator 81 is disposed away from the individual liquid chamber by more than one-tenth of the common-liquid-chamber height H.

A third comparative example, which is not included in embodiments of the present disclosure, is described below. FIG. 21 is a schematic cross-sectional view of a liquid discharge head according to the third comparative example. FIG. 21 is similar to the schematic cross-sectional view of FIG. 17. As illustrated in FIG. 21, the liquid discharge head according to the third comparative example does not include the vibration attenuator 81.

Thus, the pressure vibration in the individual liquid chamber 15 propagates to an adjacent individual liquid chamber 15 through the common liquid chamber 16. Due to mutual interference, the discharging performance of the liquid discharge head may deteriorate.

Liquid Discharge Unit and Liquid Discharge Apparatus

Figure 23:
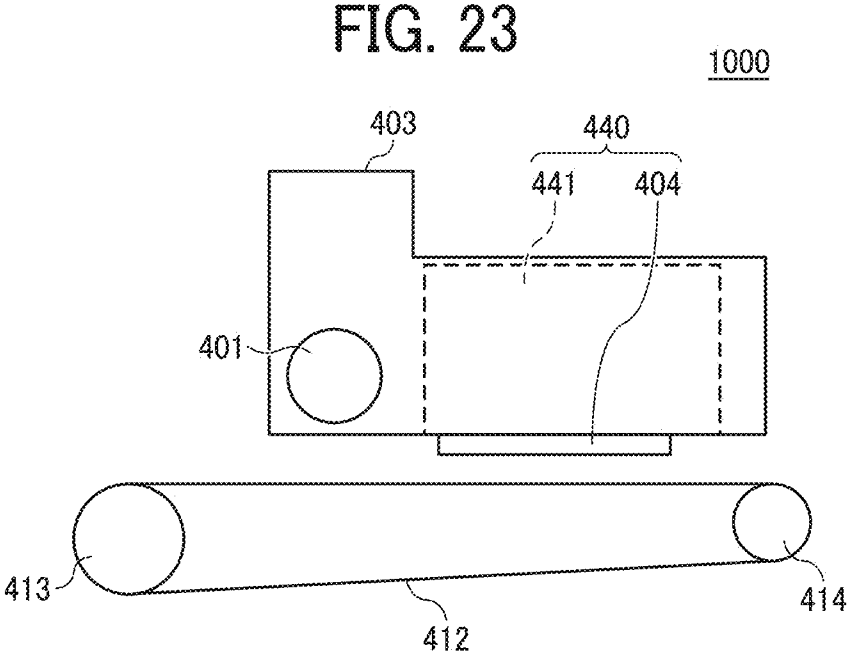
FIG. 23 is a schematic side view of the liquid discharge apparatus of FIG. 22.

A liquid discharge apparatus according to an embodiment of the present disclosure is described below with reference to FIGS. 22 and 23. FIG. 22 is a plan view of a part of the liquid discharge apparatus. FIG. 23 is a side view of the part of the liquid discharge apparatus. A liquid discharge unit in the following description is included in the liquid discharge apparatus according to the present embodiment.

A liquid discharge apparatus 1000 is a serial type apparatus, and a carriage 403 reciprocally moves in the main scanning direction by a main scanning movement mechanism 493. The main scanning movement mechanism 493 includes a guide 401, a main scanning motor 405, and a timing belt 408. The guide 401 is bridged between a left side plate 491A and a right side plate 491B and holds the carriage 403 movably. Then, the carriage 403 reciprocates in the main scanning direction due to the main scanning motor 405 through the timing belt 408 stretched around a drive pulley 406 and a driven pulley 407.

The carriage 403 is equipped with a liquid discharge unit 440 including a liquid discharge head 404 according to the present embodiment and a head tank 441, integrally. The liquid discharge head 404 of the liquid discharge unit 440 discharges liquids in colors such as yellow (Y), cyan (C), magenta (M), and black (K). The liquid discharge head 404 is attached such that a nozzle array of multiple nozzles 4 is disposed in a sub-scanning direction orthogonal to the main scanning direction with a downward discharge direction. As the liquid discharge head 404, for example, any of the liquid discharge heads 100 described above can be used.

A supply mechanism 494 for supplying the liquid discharge head 404 with liquid stored outside the liquid discharge head 404 supplies the head tank 441 with liquid stored in a liquid cartridge 450. The supply mechanism 494 includes a cartridge holder 451 as a charger to which the liquid cartridge 450 is attached, a tube 456, and a liquid feeding unit 452 including a liquid feeding pump. The liquid cartridge 450 is detachably attached to the cartridge holder 451. The liquid feeding unit 452 feeds liquid from the liquid cartridge 450 to the head tank 441 through the tube 456.

The liquid discharge apparatus 1000 includes a conveyance mechanism 495 for conveying a sheet 410. The conveyance mechanism 495 includes a conveying belt 412 as a conveyor and a sub-scanning motor 416 for driving the conveying belt 412. The conveying belt 412 attracts and conveys the sheet 410 (i.e., a medium) to a position facing the liquid discharge head 404. The conveying belt 412 serves as an endless belt stretched around a conveying roller 413 and a tension roller 414. Such attraction as above can be achieved by electrostatic attraction or air suction.

Then, through a timing belt 417 and a timing pulley 418, the sub-scanning motor 416 drives the conveying roller 413 to rotate, so that the conveying belt 412 runs circumferentially in the sub-scanning direction. Furthermore, on the lateral side of the conveying belt 412 on one side in the main scanning direction of the carriage 403, a maintenance mechanism 420 is disposed so as to maintain the liquid discharge head 404. The maintenance mechanism 420 includes, for example, a cap 421 that caps the nozzle face of the liquid discharge head 404 (face having the nozzles 4) and a wiper 422 that wipes the nozzle face.

The main scanning movement mechanism 493, the supply mechanism 494, the maintenance mechanism 420, and the conveyance mechanism 495 are attached to a housing including the side plates 491A and 491B and a rear plate 491C. In the liquid discharge apparatus having such a configuration as above, the sheet 410 is fed on and attracted to the conveying belt 412. Then, the sheet 410 is conveyed in the sub-scanning direction due to a circumferential run of the conveying belt 412.

Then, with the carriage 403 moving in the main scanning direction, the liquid discharge head 404 is driven, in accordance with an image signal, to discharge liquid to the sheet 410 remaining stopped, leading to formation of an image. As above, the liquid discharge apparatus including the liquid discharge head according to the present embodiment can stably form a high-quality image.

Figure 24:
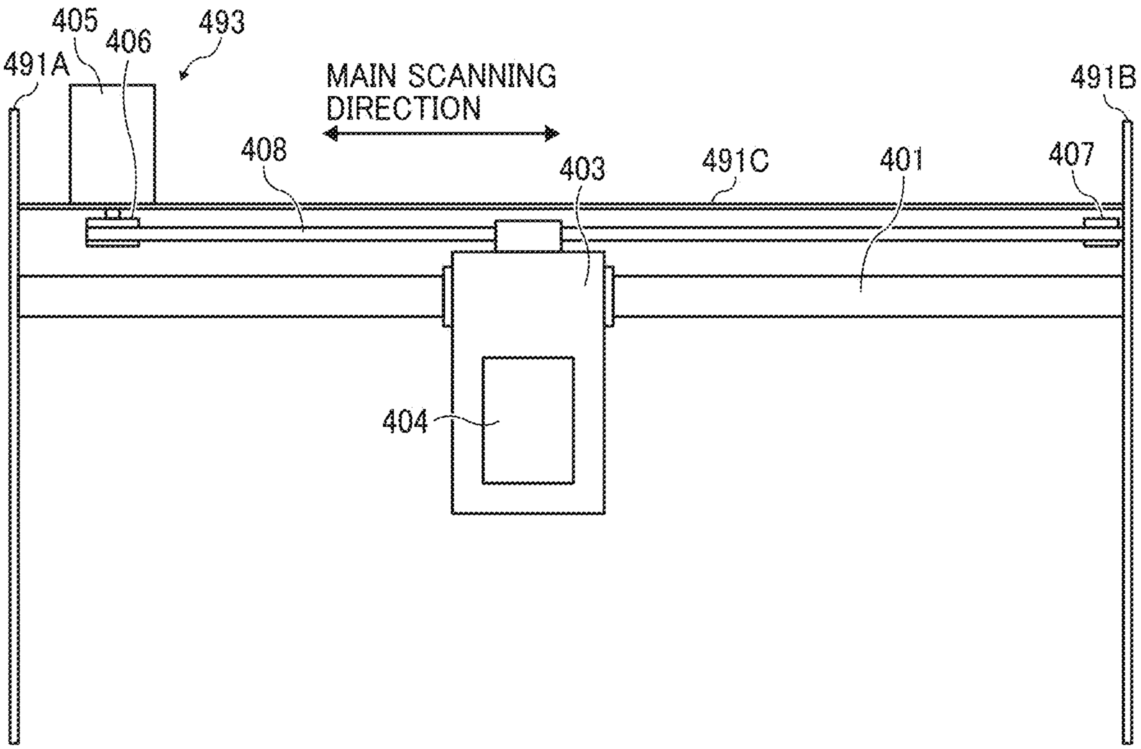
FIG. 24 is a schematic plan view of a liquid discharge unit according to embodiments of the present disclosure.

Another liquid discharge unit according to the present embodiment is described below with reference to FIG. 24. FIG. 24 is a plan view of a part of the liquid discharge unit. The liquid discharge unit includes the housing including the side plates 491A and 491B and the rear plate 491C, the main scanning movement mechanism 493, the carriage 403, and the liquid discharge head 404 that are constituent members of the liquid discharge apparatus described above. For example, the liquid discharge unit may have the side plate 491B to which at least either the maintenance mechanism 420 or the supply mechanism 494 described above is attached.

Figure 25:
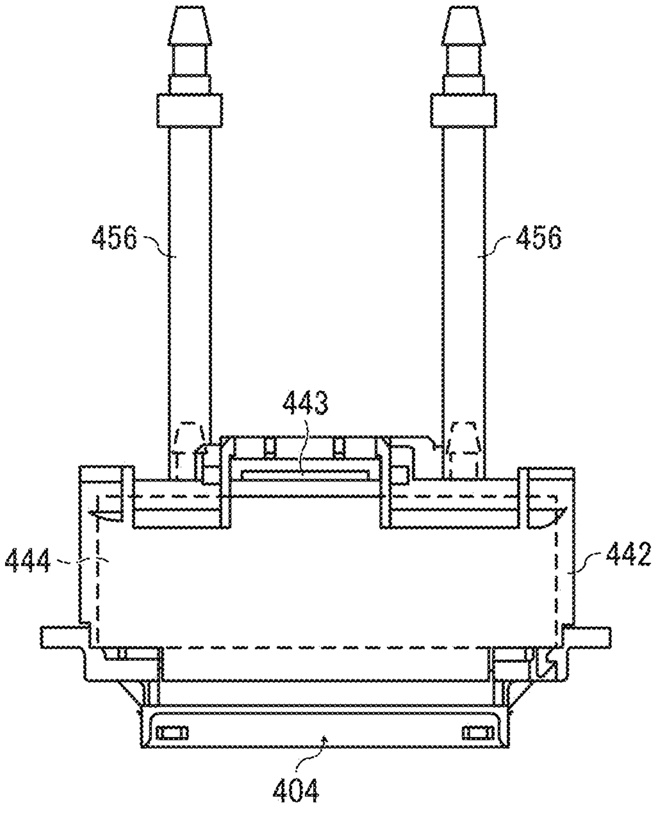
FIG. 25 is a schematic view of another liquid discharge unit according to embodiments of the present disclosure.

Yet another liquid discharge unit according to the present embodiment is described below with reference to FIG. 25. FIG. 25 is a front view of the liquid discharge unit. The liquid discharge unit includes a liquid discharge head 404 to which a channel component 444 is attached and a tube 456 coupled to the channel component 444. The channel component 444 is disposed inside a cover 442. Instead of the channel component 444, a head tank 441 can be provided. The channel component 444 has an upper portion provided with a connector 443 for electrical connection with the liquid discharge head 404.

In embodiments of the present disclosure, the "liquid discharge apparatus" includes a liquid discharge head or a liquid discharge unit and drives the liquid discharge head to discharge liquid. Examples of such a liquid discharge apparatus include an apparatus that can discharge liquid to a medium to which the liquid can adhere and an apparatus that discharges liquid into gas or liquid.

The "liquid discharge apparatus" can include a feeder, a conveyor, and an ejector for a medium to which liquid can adhere, a pre-treatment device, and a post-treatment device.

Examples of the "liquid discharge apparatus" include an image forming apparatus that discharges ink to a sheet to form an image on the sheet and a three-dimensional fabrication apparatus that discharges fabrication liquid to a powder layer in which powder material is layered, in order to fabricate a three-dimensional fabrication object.

The "liquid discharge apparatus" is not limited to an apparatus that discharges liquid to visualize a meaningful image, such as a character or a figure. Examples of the "liquid discharge apparatus" include an apparatus that forms a pattern having no meaning and an apparatus that fabricates a meaningless three-dimensional image.

The "medium to which liquid can adhere" described above corresponds to a medium to which liquid can adhere at least temporarily, such as a medium to which liquid is fixed after adhering to or a medium into which liquid permeates after adhering to. Specific examples of the medium to which liquid can adhere include recording media, such as a sheet, recording paper, a recording sheet, a film, and cloth, electronic components, such as an electronic substrate and a piezoelectric element, and media, such as a powder layer, an organ model, and a testing cell. Unless otherwise particularly limited, any media to which liquid adheres is included.

The material of the "medium to which liquid can adhere" described above may be any material to which liquid can adhere even temporarily, such as paper, thread, fiber, fabric, leather, metal, plastic, glass, wood, ceramic, a building material, such as wallpaper or flooring, or a textile for clothing.

Examples of the "liquid" include ink, treatment liquid, a deoxyribonucleic acid (DNA) sample, resist, pattern material, a binder, fabrication liquid, and a solution or dispersion liquid containing an amino acid, protein, or calcium.

The "liquid discharge apparatus" may be, but not limited to, an apparatus in which a liquid discharge head and a medium to which liquid can adhere move relatively. Specific examples of such an apparatus include a serial head apparatus that moves a liquid discharge head and a line head apparatus that does not move a liquid discharge head.

Examples of the "liquid discharge apparatus" further include a treatment-liquid coating apparatus that discharges, for the purpose of reforming the surface of a sheet, treatment liquid to a sheet to coat the surface of the sheet with the treatment liquid, and a jet granulation apparatus that jets, through a nozzle, a composition liquid including row material dispersed in a solution to granulate fine particles of the row material.

The "liquid discharge unit" corresponds to a combination of a liquid discharge head and a functional component or mechanism, namely, an aggregation of components relating to liquid discharge. Examples of the "liquid discharge unit" include a combination of a liquid discharge head with at least one constituent of a head tank, a carriage, a supply mechanism, a maintenance mechanism, and a main scanning movement mechanism.

Examples of such a combination as above include an assembly of a liquid discharge head and a functional component or mechanism secured together, for example, by fastening, bonding, or engaging, and an assembly of a liquid discharge head and a functional component or mechanism, in which one of the liquid discharge head and the functional component or mechanism is held movably to the other. A liquid discharge head and a functional component or mechanism may be detachably attachable to each other.

For example, a liquid discharge unit includes a liquid discharge head and a head tank combined together, like the liquid discharge unit 440 illustrated in FIG. 23. Another liquid discharge unit includes a liquid discharge head and a head tank combined together based on mutual coupling with a tube. Such a liquid discharge unit may include, between the head tank and the liquid discharge head, a unit including a filter.

Another liquid discharge unit includes a liquid discharge head and a carriage combined together.

Another liquid discharge unit includes a liquid discharge head and a main scanning movement mechanism combined together, in which the liquid discharge head is movably held by a guide that is part of the main scanning movement mechanism. As illustrated in FIG. 24, a liquid discharge unit includes a liquid discharge head, a carriage, and a main scanning movement mechanism combined together.

Another liquid discharge unit includes a liquid discharge head, a carriage, and a maintenance mechanism combined together, in which the liquid discharge head is attached to the carriage, and a cap that is part of the maintenance mechanism is secured to the carriage.

As illustrated in FIG. 25, another liquid discharge unit includes a liquid discharge head and a supply mechanism combined together, in which a head tank or a channel component is attached to the liquid discharge head, and a tube is coupled to the liquid discharge head.

A main scanning movement mechanism may be a guide as a single item. A supply mechanism may be a tube as a single item or a loader as a single item.

The "liquid discharge head" is not limited in terms of a pressure generator to be used. For example, instead of such a piezoelectric actuator as described in some embodiments of the above embodiments (or a multilayered piezoelectric element), used may be a thermal actuator employing a thermoelectric transducer, such as a heat-generating resistor, or an electrostatic actuator including a diaphragm and opposed electrodes.

The terms "image forming," "recording," "printing," "image printing," "print," and "fabricating" used herein are synonymous with each other.

Aspects of the present disclosure are, for example, as follows.

Aspect 1

A liquid discharge head includes: a frame provided with a common liquid chamber; a channel substrate provided with multiple individual liquid chambers in communication with the common liquid chamber; and a vibration attenuator provided, in the common liquid chamber, at a predetermined position between an end and another end of the common liquid chamber in a liquid discharge direction of the liquid discharge head. The vibration attenuator has a through hole that forms a channel for liquid in the common liquid chamber.

In other words, a liquid discharge head includes a nozzle plate, a channel substrate, a frame, and a vibration attenuator. The nozzle plate has multiple nozzles from which a liquid is discharged in a liquid discharge direction. The channel substrate has multiple individual liquid chambers communicating with the multiple nozzles, respectively. The frame has a first end adjacent to the channel substrate, a second end opposite the first end in the liquid discharge direction, and a common liquid chamber between the first end and the second end and communicating with the multiple individual liquid chambers. The vibration attenuator is disposed between the first end and the second end in the common liquid chamber. The vibration attenuator has a through hole through which the liquid flows in the common liquid chamber.

Aspect 2

In the liquid discharge head according to Aspect 1, the vibration attenuator includes multiple dampers each including: a thin portion; a damper partition; a thick portion facing the thin portion; and an air layer surrounded by the thin portion, the damper partition, and the thick portion. The air layer ensures a deformable region of the thin portion.

In other words, the vibration attenuator includes multiple dampers each including: a first thickness portion; a second thickness portion facing the first thickness portion, the second thickness portion thicker than the first thickness portion; a damper partition between the first thickness portion and the second thickness portion and defining an air layer enclosed by the first thickness portion, the second thickness portion, and the damper partition. The first thickness portion is deformable in the air layer toward the second thickness portion.

Aspect 3

In the liquid discharge head according to Aspect 2, the thin portion has a face parallel to or substantially parallel to a joint face between the frame and the channel substrate. The thin portion is disposed closer to the multiple individual liquid chambers than the thick portion.

In other words, each of the frame and the channel substrate has a joint face at which the frame and the channel substrate joined with each other. The first thickness portion has a face parallel to the joint face. The first thickness portion faces the multiple individual liquid chambers and is closer to the multiple individual liquid chambers than the second thickness portion.

Aspect 4

In the liquid discharge head according to Aspect 2 or 3, the first thickness portion (thin portion) has a compliance larger than a compliance of the air layer.

Aspect 5

In the liquid discharge head according to any one of Aspects 2 to 4, the air layer communicates (is in communication with) atmosphere.

Aspect 6

In the liquid discharge head according to any one of Aspects 2 to 5, the through hole and the multiple dampers of the vibration attenuator are arrayed two-dimensionally.

In other words, the multiple nozzles are arrayed in a nozzle array direction. The vibration attenuator further has multiple through holes including the through hole. The multiple through holes and the multiple dampers are alternately arranged in the nozzle array direction.

Aspect 7

In the liquid discharge head according to any one of Aspects 2 to 6, the first thickness portion (thin portion) has a hardness lower than a hardness of the damper partition.

Aspect 8

In the liquid discharge head according to any one of Aspects 1 to 7, the vibration attenuator is provided closer to the multiple individual liquid chambers than a middle point of a common-liquid-chamber height. The common-liquid-chamber height is a distance between one end and another end of the common liquid chamber in the liquid discharge direction of the liquid discharge head.

In other words, the vibration attenuator is closer to the first end than to the second end in the liquid discharge direction.

Aspect 9

In the liquid discharge head according to any one of Aspects 1 to 7, a distance between the vibration attenuator and the multiple individual liquid chambers is not more than half of a distance between an individual liquid chamber and another individual liquid chamber adjacent to the individual liquid chamber in the multiple individual liquid chambers in communication with the common liquid chamber.

In other words, a distance between the vibration attenuator and the multiple individual liquid chambers is not more than half of a distance between adjacent individual liquid chambers of the multiple individual liquid chambers.

Aspect 10

In the liquid discharge head according to any one of Aspects 1 to 9, the vibration attenuator has a face along a joint face between the frame and the channel substrate. A direction orthogonal to the face is identical to a thickness direction of the vibration attenuator. The vibration attenuator includes two regions, excluding the through hole, different in thickness in the thickness direction.

In other words, each of the frame and the channel substrate having a joint face at which the frame and the channel substrate joined with each other. The vibration attenuator has a face parallel to the joint face. The vibration attenuator includes two regions having different thicknesses in the liquid discharge direction in an area other than the through hole.

Aspect 11

The liquid discharge head according to any one of Aspects 1 to 10, further includes a nozzle plate having nozzles in communication one-to-one with the multiple individual liquid chambers. The through hole is smaller in diameter than the nozzles.

In other words, the through hole has a diameter smaller than a diameter of the multiple nozzles.

Aspect 12

The liquid discharge head according to any one of Aspects 1 to 11, further includes a nozzle plate having nozzles in communication one-to-one with the multiple individual liquid chambers. Liquid is discharged from the multiple individual liquid chambers due to vibration of the nozzle plate.

In other words, the nozzle plate vibrates to discharge the liquid from the multiple nozzles.

Aspect 13

In the liquid discharge head according to any one of Aspects 1 to 12, the common liquid chamber includes: a mainstream section; and multiple branch sections that branch from the mainstream section. The multiple branch sections are provided closer to the multiple individual liquid chambers than the mainstream section. The multiple branch sections are provided with the vibration attenuator.

In other words, the common liquid chamber includes a mainstream section and multiple branch sections branching from the mainstream section. The multiple branch sections are closer to the multiple individual liquid chambers than the mainstream section. The vibration attenuator is in the multiple branch sections.

Aspect 14

In the liquid discharge head according to any one of Aspects 1 to 13, the liquid discharge head is of a circulation type.

In other words, the common liquid chamber includes a supply-side common liquid chamber to supply the liquid to the multiple individual liquid chambers and a collection-side common liquid chamber to collect the liquid from the multiple individual liquid chambers. The liquid is circulated from the supply-side common liquid chamber to the collection-side common liquid chamber through the multiple individual liquid chambers.

Aspect 15

In the liquid discharge head according to Aspect 14, the common liquid chamber includes: a supply-side common liquid chamber for supplying liquid to the multiple individual liquid chambers; and a collection-side common liquid chamber for collecting the liquid from the multiple individual liquid chambers. The supply-side common liquid chamber and the collection-side common liquid chamber are each provided with the vibration attenuator.

In other words, the vibration attenuator is disposed in each of the supply-side common liquid chamber and the collection-side common liquid chamber.

Aspect 16

In the liquid discharge head according to Aspect 14 or 15, the common liquid chamber includes: a supply-side common liquid chamber for supplying liquid to the multiple individual liquid chambers; and a collection-side common liquid chamber for collecting the liquid from the multiple individual liquid chambers. The supply-side common liquid chamber includes: a supply mainstream section; and multiple supply branch sections that branch from the supply mainstream section. The multiple supply branch sections are provided closer to the multiple individual liquid chambers than the supply mainstream section. The collection-side common liquid chamber includes: a collection mainstream section; and multiple collection branch sections that branch from the collection mainstream section. The multiple collection branch sections are provided closer to the multiple individual liquid chambers than the collection mainstream section. The multiple supply branch sections and the multiple collection branch sections are each provided with the vibration attenuator.

In other words, the common liquid chamber includes a supply-side common liquid chamber to supply the liquid to the multiple individual liquid chambers and a collection-side common liquid chamber to collect the liquid from the multiple individual liquid chambers. The supply-side common liquid chamber includes a supply mainstream section and multiple supply branch sections branching from the supply mainstream section. The multiple supply branch sections are closer to the multiple individual liquid chambers than the supply mainstream section. The collection-side common liquid chamber includes a collection mainstream section and multiple collection branch sections branching from the collection mainstream section. The multiple collection branch sections are closer to the multiple individual liquid chambers than the collection mainstream section. The vibration attenuator is disposed in each of the multiple supply branch sections and the multiple collection branch sections.

Aspect 17

A liquid discharge apparatus includes the liquid discharge head according to any one of Aspects 1 to 16.

In other words, a liquid discharge apparatus includes the liquid discharge head to discharge the liquid to a medium and a conveyor to convey the medium to a position facing the liquid discharge head.

As described above, according to one aspect of the present disclosure, a liquid discharge head can be provided that can prevent the pressure vibration in the individual liquid chamber from propagating to another individual liquid chamber and the fluid resistance of the common liquid chamber from increasing to discharge liquid satisfactorily.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head comprising:

a nozzle plate having multiple nozzles from which a liquid is discharged in a liquid discharge direction;

a channel substrate having multiple individual liquid chambers communicating with the multiple nozzles, respectively;

a frame having:

a first end adjacent to the channel substrate;

a second end opposite the first end in the liquid discharge direction; and a common liquid chamber between the first end and the second end and communicating with the multiple individual liquid chambers;

a vibration attenuator between the first end and the second end in the common liquid chamber, the vibration attenuator having a through hole through which the liquid flows in the common liquid chamber;

wherein the vibration attenuator includes multiple dampers each including:

a first thickness portion;

a second thickness portion facing the first thickness portion, the second thickness portion thicker than the first thickness portion; and a damper partition between the first thickness portion and the second thickness portion and defining an air layer enclosed by the first thickness portion, the second thickness portion, and the damper partition, the first thickness portion is deformable into the air layer toward the second thickness portion;

wherein each of the frame and the channel substrate has a joint face at which the frame and the channel substrate are joined with each other, the first thickness portion has a face parallel to the joint face, and the first thickness portion faces the multiple individual liquid chambers and is closer to the multiple individual liquid chambers than the second thickness portion.

2. The liquid discharge head according to claim 1, wherein the first thickness portion has a compliance larger than a compliance of the air layer.

3. The liquid discharge head according to claim 1, wherein the air layer communicates with atmosphere.

4. The liquid discharge head according to claim 1, wherein the multiple nozzles are arrayed in a nozzle array direction, the vibration attenuator further includes multiple through holes including the through hole, and the multiple dampers and the multiple through holes are alternately arranged in the nozzle array direction.

5. The liquid discharge head according to claim 1, wherein the first thickness portion has a hardness lower than a hardness of the damper partition.

6. The liquid discharge head according to claim 1, wherein the vibration attenuator is closer to the first end than to the second end in the liquid discharge direction.

7. The liquid discharge head according to claim 1, wherein a distance between the vibration attenuator and the multiple individual liquid chambers is not more than half of a distance between adjacent individual liquid chambers of the multiple individual liquid chambers.

8. The liquid discharge head according to claim 1, wherein each of the frame and the channel substrate has a joint face at which the frame and the channel substrate are joined with each other, the vibration attenuator has a face parallel to the joint face, and the vibration attenuator includes two regions having different thicknesses in the liquid discharge direction in an area other than the through hole.

9. The liquid discharge head according to claim 1, wherein the through hole has a diameter smaller than a diameter of the multiple nozzles.

10. The liquid discharge head according to claim 1, wherein the nozzle plate vibrates to discharge the liquid from the multiple nozzles.

11. The liquid discharge head according to claim 1, wherein the common liquid chamber includes:

a mainstream section; and multiple branch sections branching from the mainstream section, the multiple branch sections are closer to the multiple individual liquid chambers than the mainstream section, and the vibration attenuator is in the multiple branch sections.

12. The liquid discharge head according to claim 1, wherein the common liquid chamber includes:

a supply-side common liquid chamber to supply the liquid to the multiple individual liquid chambers; and a collection-side common liquid chamber to collect the liquid from the multiple individual liquid chambers, and the liquid is circulated from the supply-side common liquid chamber to the collection-side common liquid chamber through the multiple individual liquid chambers.

13. The liquid discharge head according to claim 12, wherein the vibration attenuator is in each of the supply-side common liquid chamber and the collection-side common liquid chamber.

14. The liquid discharge head according to claim 12, wherein the common liquid chamber includes:

a supply-side common liquid chamber to supply the liquid to the multiple individual liquid chambers, the supply-side common liquid chamber including:

a supply mainstream section; and multiple supply branch sections branching from the supply mainstream section, the multiple supply branch sections closer to the multiple individual liquid chambers than the supply mainstream section; and a collection-side common liquid chamber to collect the liquid from the multiple individual liquid chambers, the collection-side common liquid chamber including:

a collection mainstream section; and multiple collection branch sections branching from the collection mainstream section, the multiple collection branch sections closer to the multiple individual liquid chambers than the collection mainstream section, and the vibration attenuator is in each of the multiple supply branch sections and the multiple collection branch sections.

15. A liquid discharge apparatus comprising:

the liquid discharge head according to claim 1, to discharge the liquid to a medium; and a conveyor to convey the medium to a position facing the liquid discharge head.

* * * * *